United States Patent [19]

Harris

[11] 4,408,307

[45] Oct. 4, 1983

[54] OPTICAL TRANSMISSION OF DIGITAL SEISMIC DATA

[75] Inventor: Ralph A. Harris, Houston, Tex.

[73] Assignee: Texas Instruments Incorporated, Dallas, Tex.

[21] Appl. No.: 209,638

[22] Filed: Nov. 24, 1980

Related U.S. Application Data

[63] Continuation of Ser. No. 973,485, Dec. 26, 1978, abandoned.

[51] Int. Cl.³ .................................................. G01V 1/22
[52] U.S. Cl. ......................................... 367/79; 367/76; 340/870.28; 455/601; 455/606
[58] Field of Search ..................... 367/76, 79; 455/601, 455/606; 340/825.18, 854, 870.28

[56] References Cited

U.S. PATENT DOCUMENTS

| | | | |
|---|---|---|---|
| 3,633,035 | 1/1972 | Uchida et al. | 250/199 |
| 3,657,543 | 4/1972 | Rose | 250/199 |
| 3,705,986 | 12/1972 | Sanders et al. | 250/199 |
| 3,727,061 | 4/1973 | Dworkin | 250/199 |
| 3,851,167 | 11/1974 | Levine | 250/199 |
| 3,905,010 | 9/1975 | Fitzpatrick | 340/18 R |
| 4,086,504 | 4/1978 | Ezell et al. | 340/15.5 TS |
| 4,112,412 | 9/1978 | Howlett | 367/76 |
| 4,117,448 | 9/1978 | Siems | 340/15.5 TS |
| 4,146,872 | 3/1979 | Cartes | 340/15.5 TS |
| 4,160,157 | 7/1979 | Freeborn | 250/199 |
| 4,218,767 | 8/1980 | Joosten et al. | 367/79 |

OTHER PUBLICATIONS

Pimler et al., "A Controllable . . . Oceanography", 9/15/76, pp. 143-1-13, Oceans 1976 Confer., Wash. D. C.

Aoki et al., "Development of Optical Fiber . . .", 5/77, pp. 181-187, Hitachi Review, vol. 26, #5.
Heyhe et al., "A Digital 100 M bit/s Optical Fiber System", 3/76, pp. 249-255, Nachtrichtentechnische Zeetschrift NTZ, vol. 29, #3.
Ocean Industry, vol. 11, #6, pp. 63-64, 6/76, GCl/022.
Williams, "Fiber Optics for Data Transmission", 12/76, pp. 61-66, Instrumentation Technology.

*Primary Examiner*—Nelson Moskowitz
*Attorney, Agent, or Firm*—Thomas G. Devine; Leo N. Heiting; Melvin Sharp

[57] ABSTRACT

An optical fiber cable is used as the transmission medium for data and status signals from remote digital acquisition units to a master station of a distributed digital field system. Each digital acquisition unit has associated with it one or more sensors for sensing motion in an elastic body. The master station of the system also uses an optical fiber cable as the transmission medium for transmitting command signals to the digital acquisition units. The digital acquisition units, when first connected into the system, sense the master station signal and determine which direction to transmit. In normal operation, one digital acquisition unit receives the master station command and repeats the command to the next digital acquisition unit and so on. The digital acquisition units then reverse direction of transmission and reception, the data acquisition unit receiving from an adjacent digital acquisition unit and repeating data or status signals, then adding its own data or status signal onto the line before passing it to the next digital acquisition unit in the direction of the master station. The optical fiber cable transmission medium provides extremely high bandwidths permitting very high data rates and large numbers of channels and also provides complete immunity from electromagnetic radiation.

17 Claims, 22 Drawing Figures

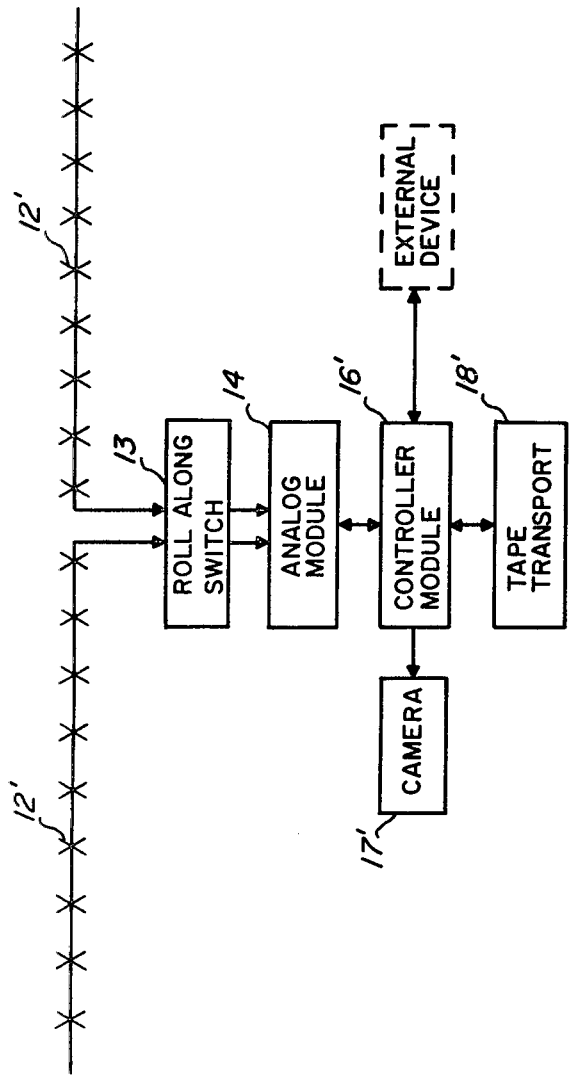
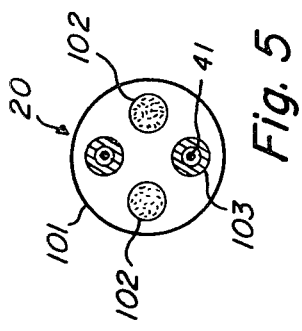
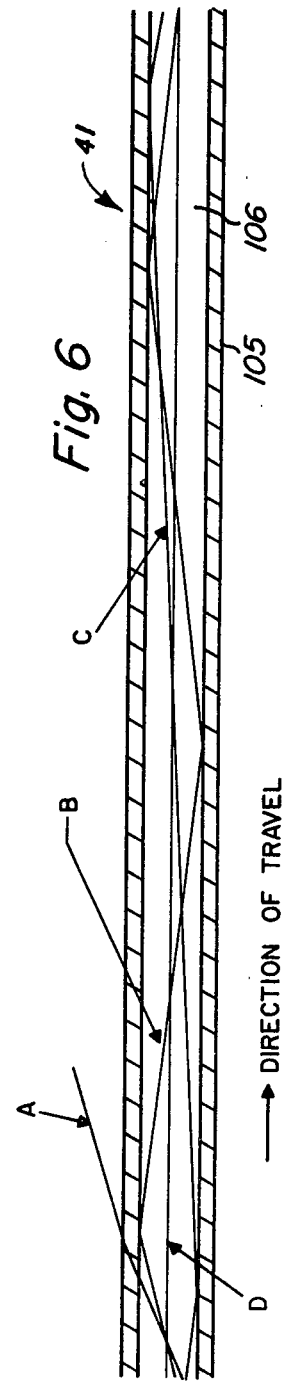
Fig. 7 PRIOR ART
Fig. 6
Fig. 5

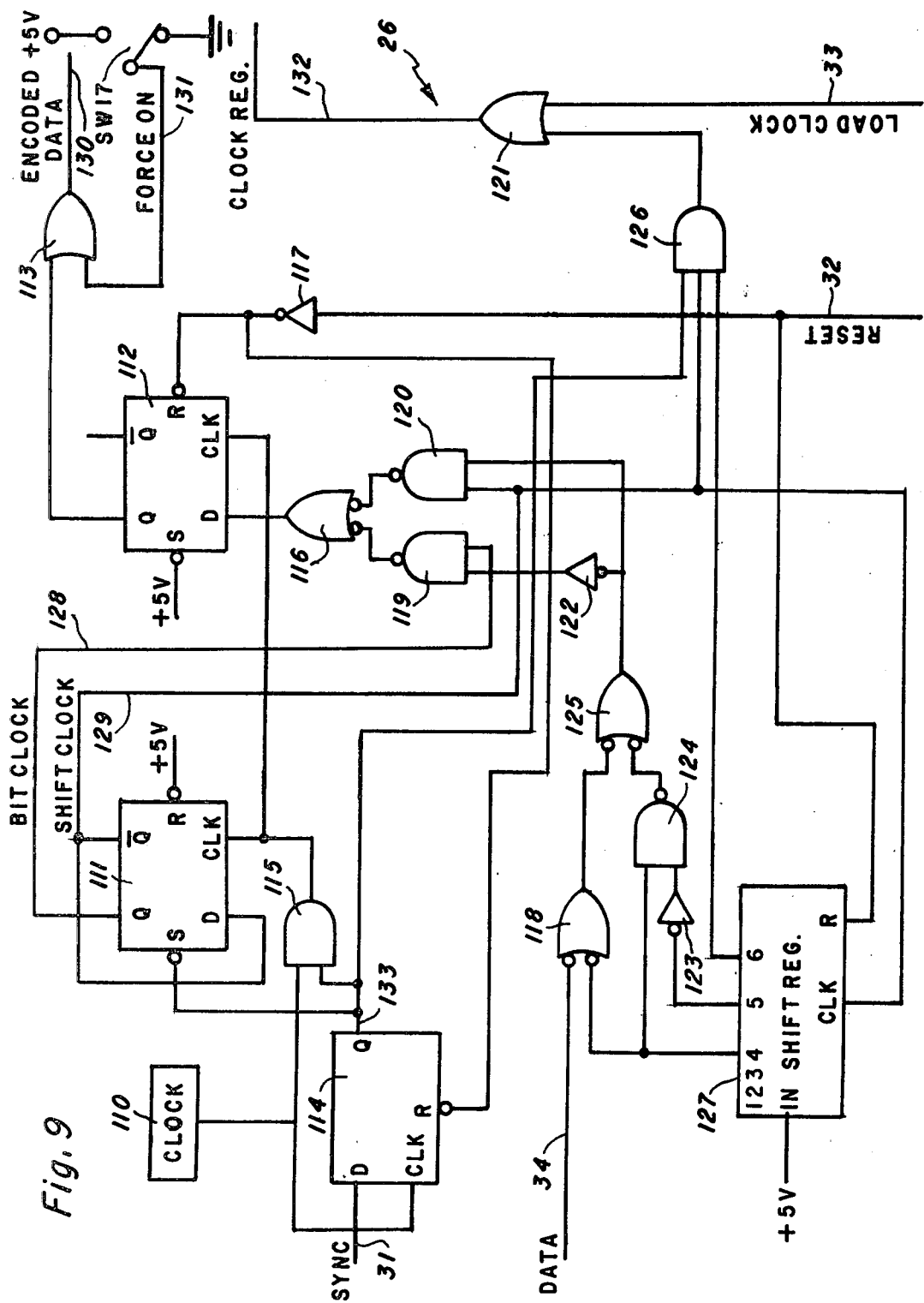

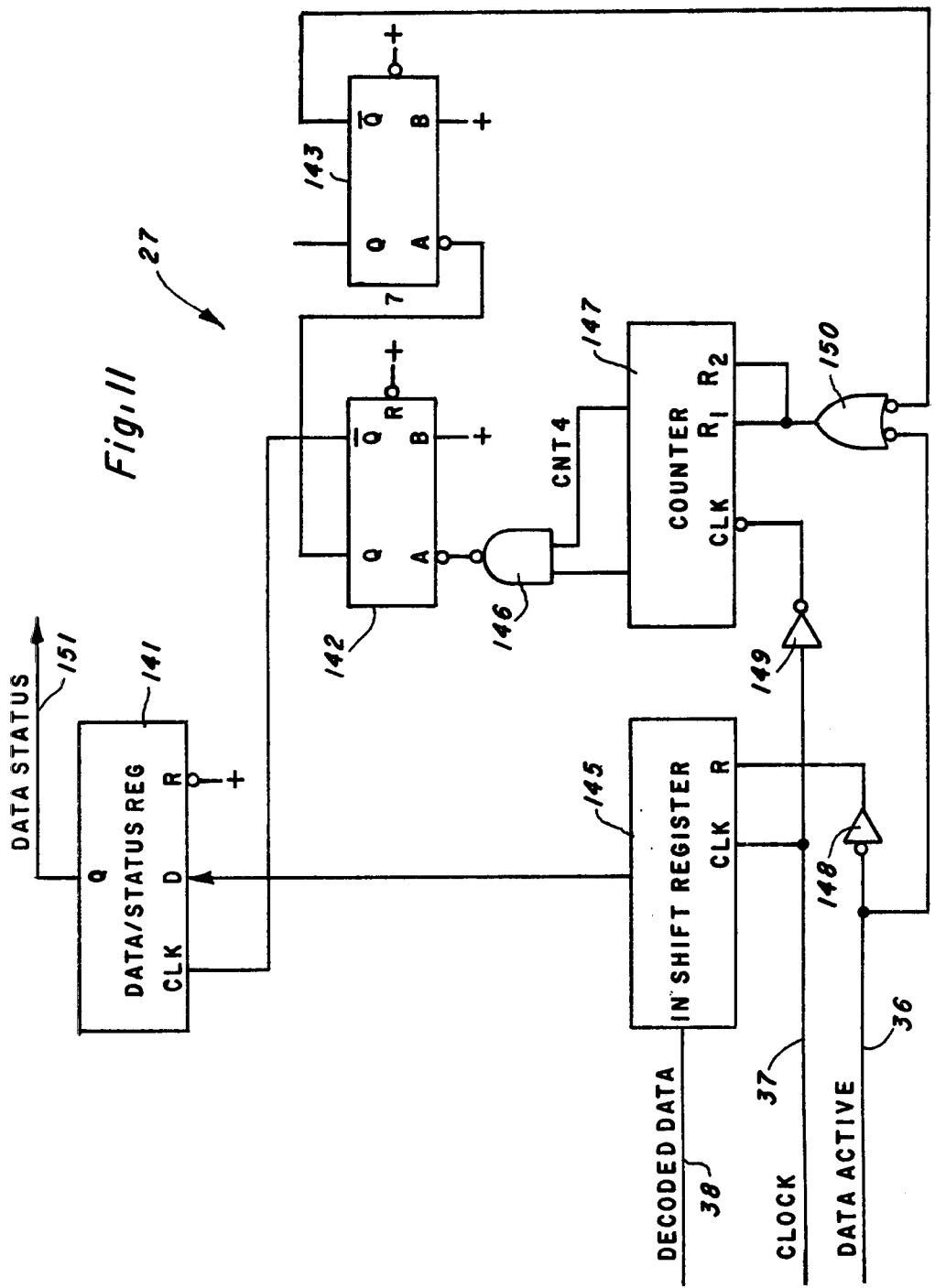

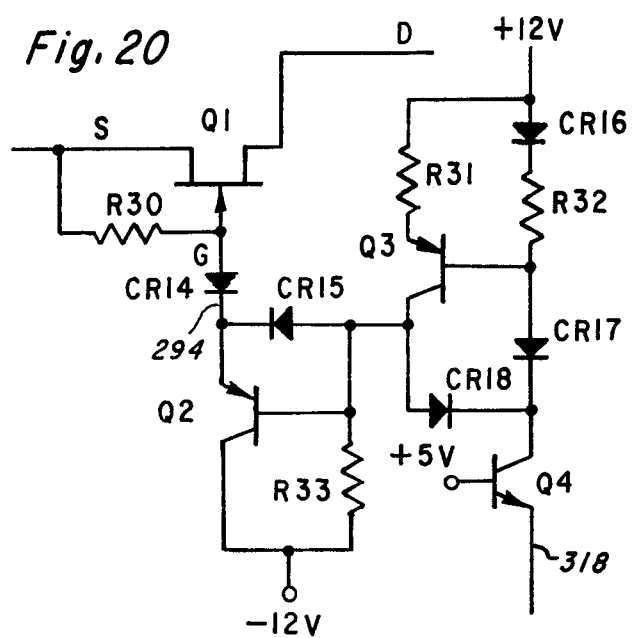

OPTICAL TRANSMISSION OF DIGITAL SEISMIC DATA

This is a continuation of application Ser. No. 973,485, filed Dec. 26, 1978, now abandoned.

BACKGROUND OF THE INVENTION

1. Field of the Invention

This invention relates to a seismic data acquisition system and more particularly to a seismic data acquisition system wherein command, data and status signals are transmitted via optical fiber cables.

2. Description of the Prior Art

Seismic data acquisition systems use detector arrays to sense ground motion directly on land or in water. The generated signal is carried to an amplifier by a twisted pair of wires. Most acquisition systems have a large number of channels. Each channel receives a signal from a detector array by a twisted pair of wires. In a commonly used prior art system, the pair of wires are in a multi-conductor cable. The signals are in general very weak. They typically vary from a few millivolts to less than one microvolt. These multi-conductor cables have the following problems associated with them:

1. Signal deterioration due to cable length
   (a) long cables cause a loss of high frequency response due to distributed capacitance.
   (b) cross-talk between channels in the cable exists
   (c) there is power line frequency pickup interference
   (d) there is interference from radio transmitters
   (e) there is static pickup from thunderstorms
2. Laying out and picking up the cable is one of the larger labor costs in land data acquisition.
3. Broken wires in the cable result in a large percentage of lost operating time. Finding the point in the cable where the wire is broken can be very time consuming. These problems are increased as more conductors are included in the cable and as the cable length is increased. Current trends in the industry indicate there will be longer cables and increasing numbers of channels.

To overcome some of these problems, radio telemetry in analog systems is used. A digital acquisition unit (DAU) is used at each of a plurality of locations where one or more motion sensors are connected to the DAU. The DAU amplifies signals received from the sensors, modulates the signals and sends them via its own transmitter, back to a master station. The following problems existed with this system:

(a) supplying power for the transmitters
(b) providing modulators with the dynamic range requirement for seismic data is nearly impossible
(c) there is radio frequency interference from nearby transmitters and from static from thunderstorms
(d) a separate carrier frequency is required for the transmitter of each DAU.

Another prior art system is an analog system which uses a magnetic recorder at each DAU. A radio receiver receives control commands from the master station. This system greatly reduces the required radio frequency bandwidth, but has the following problems:

(a) the DAU includes complex equipment and requires excessive power
(b) the magnetic record from each magnetic recorder has to be collected and transcribed to a multichannel format
(c) there is no monitor of system operation. A failure at a detector array will not be detected until the magnetic media is reproduced.

In recent times, virtually all seismic operations use digital systems. The analog signal, after amplification and filtering, is converted to a digital format. Digital data is then recorded on magnetic tape.

One such prior art system is a radio frequency telemetry system which involves a radio receiver that receives commands from a radio transmitter. The transmitter transmits data to a master station. Time division multiplexing permits sharing one carrier frequency with a number of data channels. This prior art system has the following problems:

(a) the radio frequency spectrum is crowded with users
(b) the required high data rate forces use of high frequency which involves line of sight transmission problems
(c) the available bandwidth is not adequate for systems of several hundred or more channels
(d) any form of electromagnetic radiation can interfere
(e) the power requirements are excessive Another system that has been configured is one that involves a number of DAU's which have radio receivers to receive commands from a master station, an analog to digital converter and a tape cassette for recording the digitized data. This system has the following problems:

(a) the tape cassette cannot record enough data for a typical operation
(b) there is no monitor of system operation
(c) the tape is exposed to a wide range of deleterious temperature variations
(d) gathering up the tape cassettes and transcribing them Also considered has been a digital system which involves wire line telemetry. In such a system, the wire line is intended to be less expensive and to involve less labor to deploy than the above described multi-conductor cable system. Some of these telemetry systems use coaxial cable, some use twin lead and others use a twisted pair. A wire line has a constant db loss per unit length. A wire line can only compete with a radio for short distances. For longer distances, repeaters must be used. These systems involve the following problems:

(a) line attenuation increase drastically with higher frequencies
(b) high frequencies travel faster than low frequencies, creating dispersion.

The above problems limit the length of line that can be used and force a fairly low data rate. The low data rate does not permit large numbers of channels unless multiple lines are used which introduces the problems of the multi-conductor cable. The use of a repeater in each DAU greatly reduces the above problems. The cable length is measured from one DAU to another. The data rate can be increased, allowing more channels. Also, a simple twisted pair can be used.

In the system of this invention, the fiber optics cable overcomes all of the problems identified above except that the attenuation is high. Quartz fibers now available have 20 db loss per kilometer. However, using each DAU as a repeater (as indicated above in the wire line telemetry system) solves the attenuation problem. The optical path passes extremely high bandwidths, permitting very high data rates and large numbers of channels.

Using fiber optics also immunizes the system against electromagnetic radiation. There is no lightening hazard and the system is small and lightweight, reducing deployment costs.

BRIEF SUMMARY OF THE INVENTION

A seismic data acquisition system utilizes a plurality of data acquisition units (DAU) interconnected by fiber optic cables. Each DAU has associated with it at least one sensor for sensing motion in an elastic body such as the earth. The DAU's are further connected to a master station by way of fiber optic cables.

The master station provides command signals to the DAU's and some of the timing. The master station is made up of a controller module and a telemetry interface. Peripheral equipment such as a camera and a tape transport may also be included. The telemetry interface receives electrical signals from the controller module and interfaces with the fiber optic cables to transmit digital optical signals to the DAU's. The DAU's are serially connected to the optical fiber cable and to the telemetry interface of the master station.

Each DAU has a telemetry communication portion to which the optrical fiber cables connect. The optical fiber cables, in this preferred embodiment, contain one in-fiber and one out-fiber. When a command is sensed from the master station, it is received by the first DAU in line on the in-fiber. The command is decoded and then encoded and sent out on the out-fiber to the next DAU where the process is repeated. Upon completeion of the command, each DAU reverses its direction of transmission and reception and shifts out its data in bit serial fashion, adding it to received data from other DAU's. The received data from other DAU's is decoded and encoded just as the command signal coming in the other direction and sent to the next DAU and finally to the master station.

Each DAU, upon being connected to the system, has the facility for determining which fiber optic cable is transmitting a command. The telemetry communication portion has two input fibers and two output fiber connections. A signal detect establishes which input fiber has the command signal and through automatic switching establishes the input and output relationship as determined by the input command signal. It, therefore, is not necessary for the person connecting the DAU to determine which of the optical fiber cables is the one carrying the command signal.

The principal object of this invention is to provide a seismic data collection system having extremely high bandwidths with very high data rates and large numbers of channels.

Another object of this invention is to provide a seismic data collection system that is small and lightweight, making deployment much simpler.

Still another object of this invention is to provide a system that is completely immune to electro-magnetic radiation.

These and other objects will become apparent in the detailed description that follows:

BRIEF DESCRIPTION OF THE DRAWINGS

FIG. 5 is a cross section of the fiber optic cable of FIG. 1.

FIG. 6 is a cross section of an optical fiber illustrating light travel through the fiber.

FIG. 7 is a block diagram illustrating a typical prior art land seismic data collection system.

FIG. 9 is a schematic-block diagram of the encoder of FIG. 2.

FIG. 11 is a schematic diagram of the serial-in parallel-out circuit of FIG. 2.

FIG. 20 is a schematic diagram of a drive circuit and a switch of FIG. 4.

DETAILED DESCRIPTION OF THE INVENTION

General Description

Figure 1:
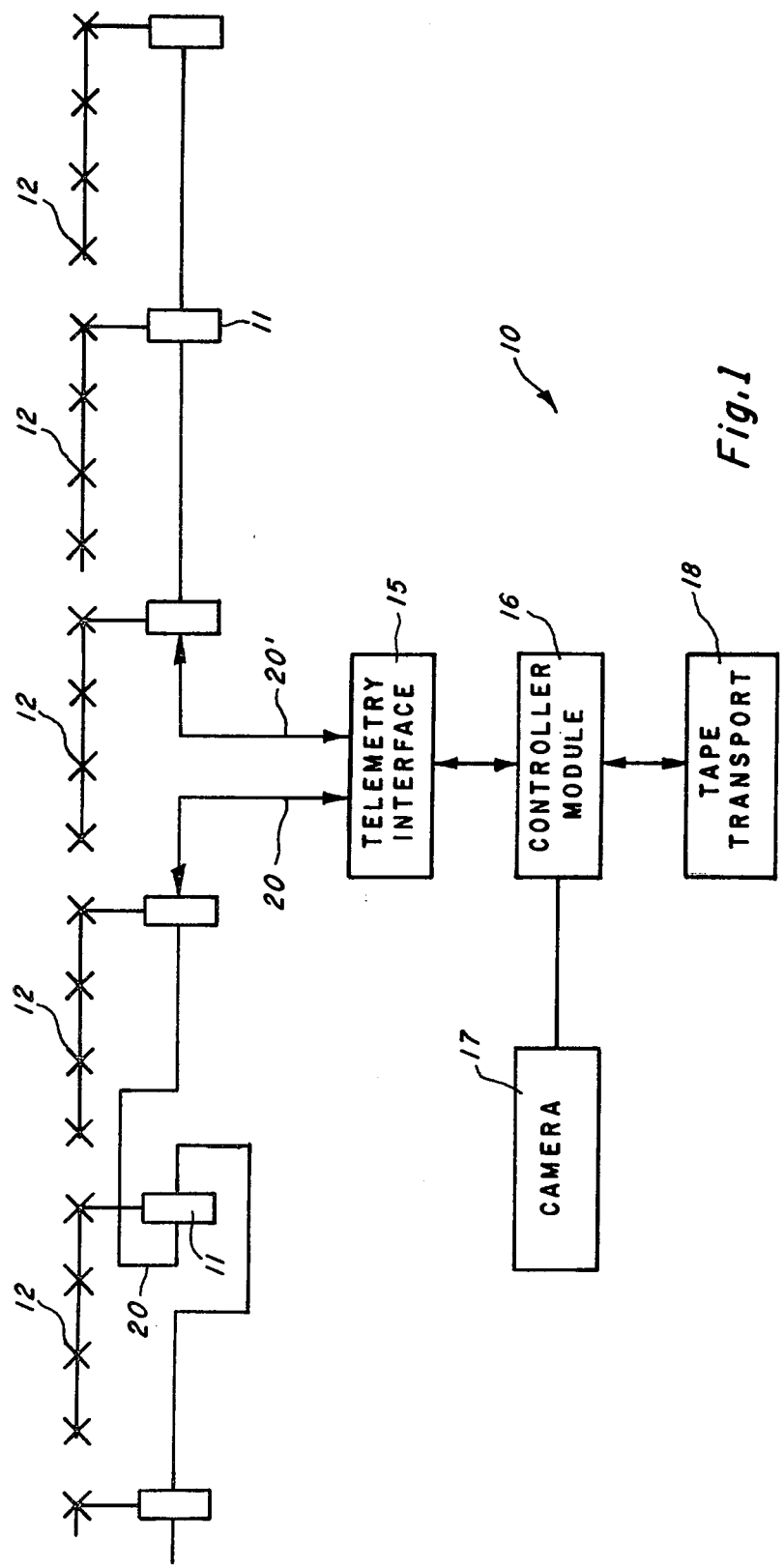
FIG. 1 is a block diagram of a seismic data collection system utilizing fiber optic cables.

FIG. 1 is a block diagram of a seismic data collection system 10 having a first plurality of data acquisition units (DAU) 11 interconnected by fiber optic cable 20' and a second plurality interconnected by fiber optic cable 20' which are in turn connected to the telemetry interface 15. The telemetry interface 15, controller module 16, camera 17 and tape transport 18 comprise a master station. The master station is capable of communication with four optic fiber cables in this preferred embodiment but of course could be designed to handle more or less.

DAU 11' is shown with the fiber optic cable 20 entering and leaving from opposite sides as compared to the other DAU's 11. This is simply to illustrate that any DAU may be hooked up without regard to which optic fiber cable ultimately connects to the telemetry interface 15. The DAU mechanism for accepting either cable will be described in detail later.

Each DAU has a plurality of sensors 12 connected to it to provide analog seismic signals. These sensors are well known and generally involve a moving coil in a magnetic field. Such sensors deliver a voltage that is proportional to the velocity of the elastic medium such as the earth. They are commonly referred to as geophones, seismometers, seises, or jugs.

The controller module 16 is a Texas Instruments Incorporated Type TI-980801 which is fully described in the DFS V "Operation and Maintenance Manual", volumes 1 and II, Manual 966182-9701 original issue Oct. 15, 1975, and in DFS V "Drawings", volumes I and II, Manual 966184-9702, original issue Feb. 19, 1975.

The Telemetry Interface

Figure 2:
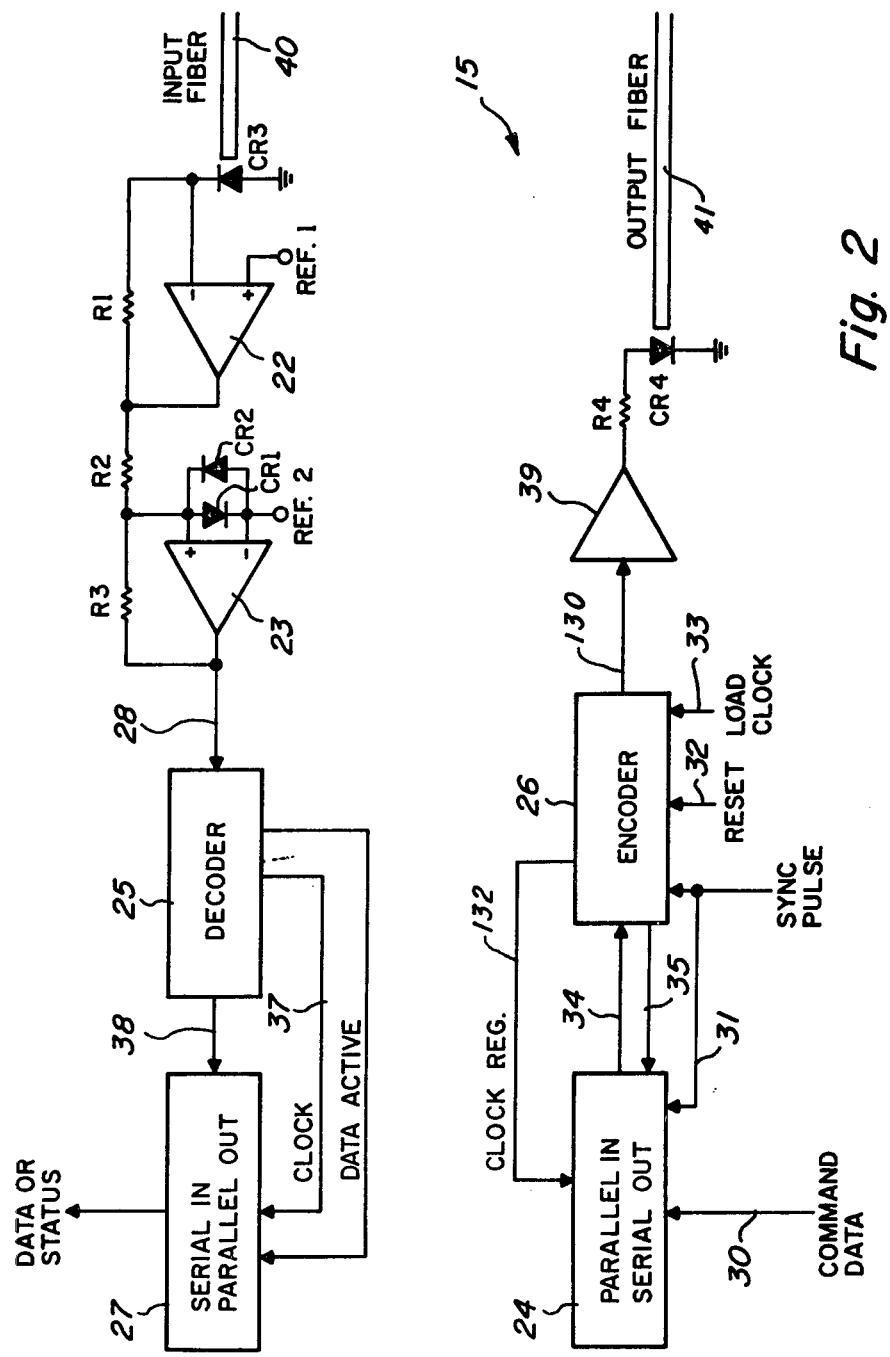
FIG. 2 is a schematic-block diagram of the telemetry interface of FIG. 1

FIG. 2 illustrates the telemetry interface 15 of FIG. 1. Signals from the DAU's come in on input fiber 40 activating photo diode CR3. In the preferred embodiment, a pin diode was selected as the receiver. An avalanche diode could have been used and also photo transistors are available for such an application. The anode of diode CR3 is connected to ground and the cathode is connected to the inverting input of high gain voltage comparator 22 whose noninverting input is connected to a positive reference voltage REF. 1 and whose output feeds back through resistor R1 to the inverting input. The output of comparator 22 also connects through resistor R2 to the noninverting input of a second voltage comparator 23 whose inverting input connects to a second positive reference voltage, REF. 2 and whose output is fed back through resistor R3 to its noninverting input. Diode CR1 has its anode connected to the noninverting input of comparator 23 and its cathode connected to the inverting input. Diode CR2 is connected across the input in opposite polarity to diode CR1. Comparators 22 and 23 may be National Semiconductor Type LH00323 described in "National Integrated Linear Circuits" dated January, 1974.

The output of comparator 23 is connected, via line 28, to an input of decoder 25, whose output 38 connects to an input of serial-in parallel-out circuit 27. A CLOCK output on line 37 and a DATA ACTIVE output on line 36 connects from decoder 25 to circuit 27.

Commands come from controller module 16 on line 30 into parallel-in serial-out circuit 24 which is connected to encoder 26 by line 34. A SYNC pulse from controller module 16 is applied to circuit 24 via line 31 and also to encoder 26. RESET and LOAD CLOCK pulses from controller module 16 are applied from line 32 and line 33, respectively, to encoder 26. The output of encoder 26 is applied to the input of light driver 39. Light driver 39 may be a National Semiconductor Type LH0002 voltage follower amplifier, described in "National Integrated Linear Circuits" mentioned above. The output of amplifier 39 is applied through resistor R4 to the anode of light emitting diode CR4 whose cathode is connected to ground. Output fiber 41 is optically coupled to light emitting diode CR44. It should be recognized that there are available optical cables which themselves contain light receivers such as pin diode CR3 and light transmitters such as light emitting diode CR4. With this type of optical cable, a direct electrical connection can be made to the appropriate input and output circuits in an obvious manner. Also, a lazer light source could be used instead of the LED circuit.

The parallel-in, serial-out register 24 is a Texas Instruments Incorporated Type SN74LS166 8-bit shift register described in Texas Instruments "The TTL Data Book for Design Engineers" copyright 1976.

FIG. 11 provides more detail of serial-in, parallel-out circuit 27 of FIG. 2. Decoded data on line 38 from decoder 25 of FIG. 2 is connected to the serial input of 24-bit Parallel-out Serial Shift Register 145 which, in this preferred embodiment, is made up of three Texas Instruments type SN74LS164, described in the TTL Data Book mentioned above. The CLOCK input on line 37 is connected to the clock input of register 145 and is inverted through inverter 149 and applied to the $\overline{clk}$ input of counter 147 which is two TI type SN74LS293 4-bit Binary Counters, also described in the TTL Data Book. The output of shift register 145 is applied as an input to data/status register 141 which is made up of two Texas Instruments type SN74LS173 4-bit D-type Registers with Three State Outputs, described in the TTL Data Book. A DATA ACTIVE signal 36 is applied through inverter 148 to the reset input of register 145 and directly as one input of NAND circuit 150 whose other input is supplied by the $\overline{Q}$ output of one shot circuit 143. The output of NAND circuit 150 is applied to the reset inputs, R1 and R2, of counter 147. A count of 16 output and a count of 4 output from counter 147 are each applied as the inputs to NAND circuit 146 whose output is applied to the input of one shot circuit 142. One shot circuits 142 and 143 are Texas Instruments type SN74LS123 Retriggerable Monostable Multivibrators, described in the TTL Data Book. The Q output of one-shot circuit 142 serves as the input to one-shot circuit 143 and the $\overline{Q}$ output of one-shot 142 serves as a clock input to the data/status register 141. The parallel outputs of register 141 are output on lines 151.

Refer now to FIG. 9 for detail of the encoder 26 of the telemetry interface 15. Clock 110 is shown having an output connected as one input to AND circuit 115. The clock having a frequency of 12.288 MHz, may be a Motorola, Incorporated type K1144A crystal oscillator described in Motorola Publication No. R29-3-13, dated 1978. Flip-flop 114 has the sync signal on line 31 and the clock input from clock 110. Its $\overline{reset}$ input is from RESET 32 through inverter 117. The Q output of flip-flop 114 is applied to the $\overline{S}$ input of flip-flop 111, to one input of AND circuit 115 and to one input of AND circuit 26. The output of AND circuit 115 serves as the clock input to both of flip-flops 111 and 112. The Q output of flip-flop 111 provides the BIT CLOCK pulse on line 128 which provides one input to NAND circuit 119. The $\overline{Q}$ output of flip-flop 111 provides the shift clock signal on line 129, providing the D input to flip-flop 111, one input to NAND circuit 120, one input to AND circuit 126 and clock input to shift register 127. The Q output of flip-flop 112 is applied as an input to OR circuit 113 whose other input is a FORCE ON input from switch SW17 on line 131 and whose output is ENCODED DATA on line 130.

The DATA input on line 34 is applied to one input of NAND gate 118 whose other input is supplied by the output of shift register 127 which is a TI SN74LS164, described above. This same output serves as an input to NAND gate 124. Another output from shift register 127 is inverted through inverter 123 and is the other input to NAND circuit 124. Still another output from shift register 127 is one input to AND circuit 126. The reset input for shift register 127 is provided from the RESET line 32 which also is inverted through inverter 117 and serves as the $\overline{R}$ input of flip-flop 112.

The outputs of NAND circuits 118 and 124 serve as the two inputs respectively of NAND circuit 125 which has an input inverted through inverter 122 for providing the other input to NAND circuit 119 and directly providing the other input to NAND circuit 120. The outputs of NAND circuits 119 and 120 provide the two inputs respectively of NAND circuit 116 whose output is the D input of flip-flop 112. The output of AND circuit 126 provides one input to OR circuit 121 whose other input is the LOAD CLOCK input on line 33 and whose output, on line 132, provides the CLOCK REG. signal.

Figure 12A:
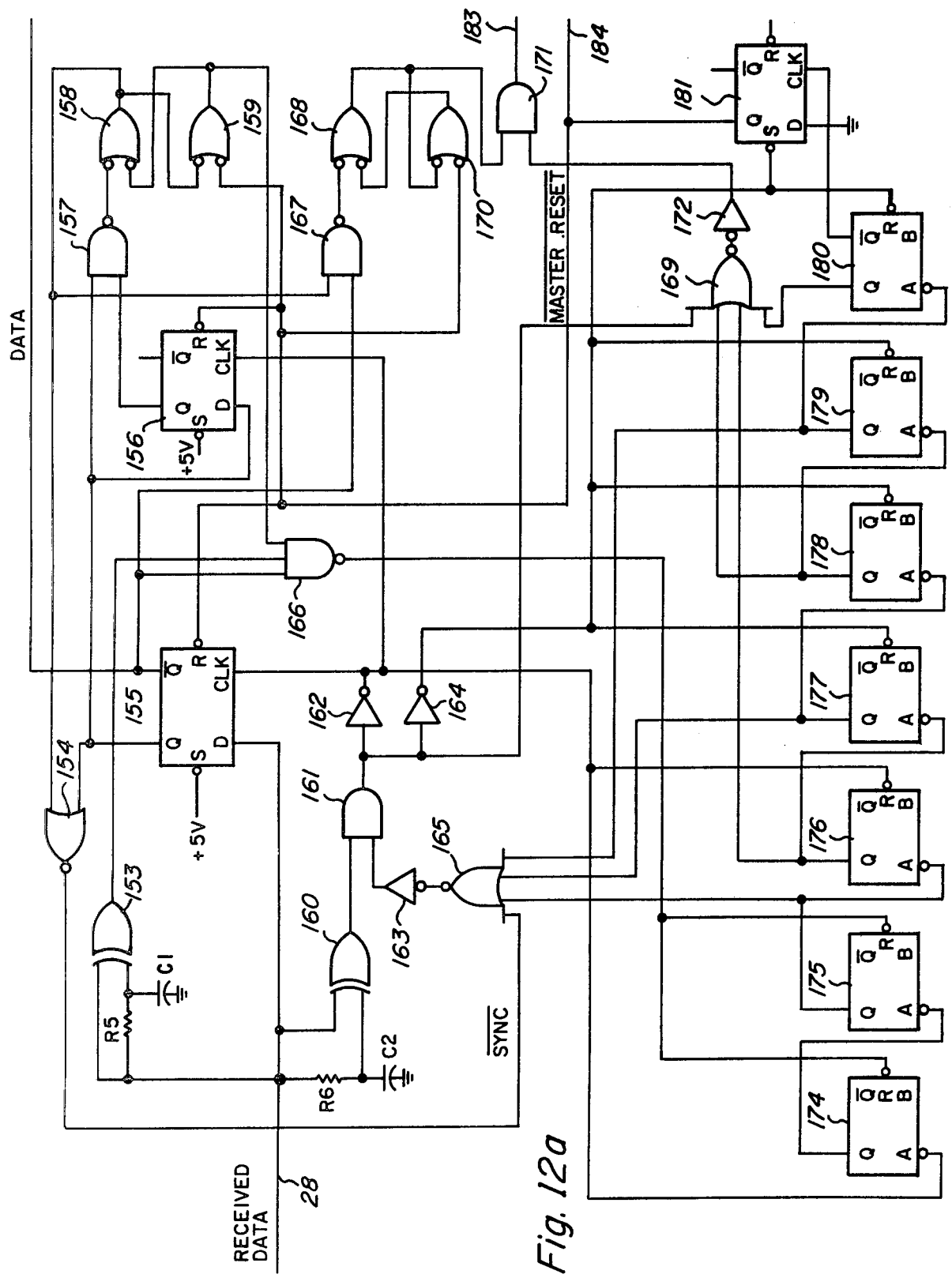
FIGS. 12a-12b together are a schematic diagram of the decoder of FIG. 2.
Figure 12B:
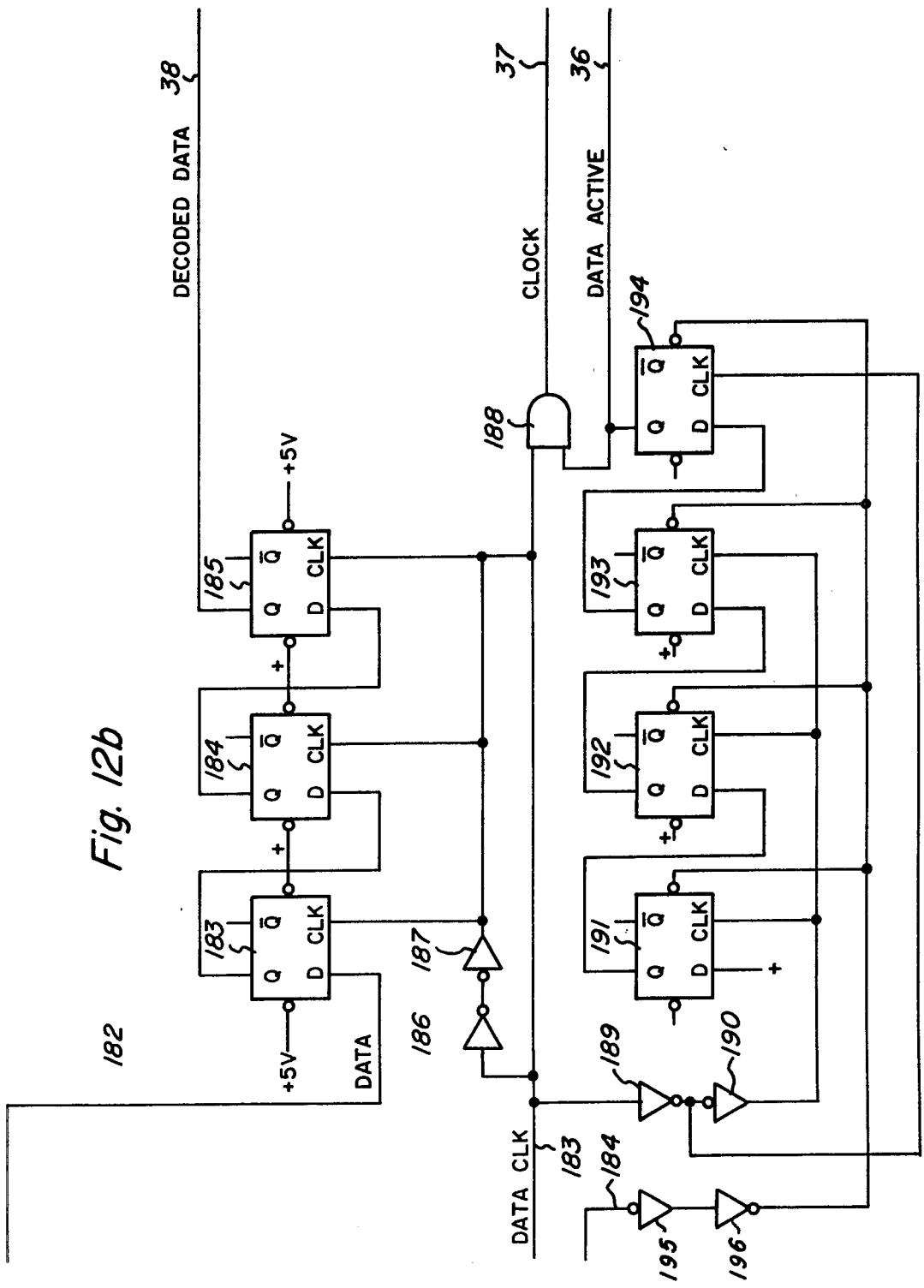

The details of the decoder 25 of FIG. 2 may be seen in FIGS. 12a-12b. The RECEIVED DATA on line 28, from the output of comparator 23 of FIG. 2, is applied as an input to each of exclusive OR circuits 153 and 160 and also as the D input to flip-flop 155. The received data on line 28 also is provided as the other input to each of exclusive OR circuits 153 and 160 through resistors R5 and R6 respectively. Capacitors C1 and C2 are connected between ground and the other input of exclusive OR circuits 153 and 160, respectively. The combinations then of resistors R5 and capacitor C1 and resistor R6 and capacitor C2 provide delays to the other respective inputs. The output of exclusive OR circuit 153 provides one input to NAND circuit 166 and the output from exclusive OR circuit 160 provides one input to AND circuit 161.

The Q output of flip-flop 155 provides one input to NOR circuit 154, the D input to flip-flop 156 and one input to NAND circuit 157. The $\overline{Q}$ output of flip-flop 155 provides another input to NAND circuit 166, one input to NAND circuit 167 and the D input to flip-flop 183.

The output from NAND circuit 166 provides the $\overline{R}$ input to both of one shots 174 and 175. The Q output from one shot 174 provides the $\overline{A}$ input to one shot 175 whose Q output provides the $\overline{A}$ input to one shot 176 and also one input to NOR circuit 165. The Q output of one shot 176 provides the $\overline{A}$ input to one shot 177 and also one input of NOR circuit 169. The Q output of one shot 177 provides the $\overline{A}$ input to one shot 178 and also provides one input to NOR circuit 165. The Q output of one shot 178 provides the $\overline{A}$ input to one shot 179 and also another input to NOR circuit 169. The Q output of one shot 179 provides the $\overline{A}$ input to one shot circuit 180 and also another input to NOR circuit 165. The Q output from one shot circuit 180 provides another input to NOR circuit 169 and its $\overline{Q}$ output provides a clock input to flip-flop 181 whose D input is grounded and whose Q output on line 184 provides the $\overline{\text{MASTER RESET}}$ which provides $\overline{R}$ inputs to flip-flops 155 and 156, respectively, one input to each of NAND circuits 159 and 170, respectively, and to inverter 195 whose output is further inverted through inverter 196 serving as the $\overline{R}$ input to flip-flops 191, 192, 193 and 194, respectively.

The output of NOR circuit 154 provides the $\overline{\text{sync}}$ signal as an input to NOR circuit 165. The output from NOR circuit 165 is inverted through inverter 163 and provides the other input to AND circuit 161. The output from AND circuit 161 is inverted through inverter 162 and provides a clock input to each of flip-flops 155 and 156 and further provides the $\overline{A}$ input to one shot 174 and the $\overline{R}$ input to one shot 176. The output of AND circuit 161 is also inverted through inverter 164 and provides the $\overline{R}$ input of one shots 177, 178, 179 and 180, respectively, and the $\overline{S}$ input of flip-flop 181.

The output of NAND circuit 157 provides one input to NAND circuit 158 whose output provides the other input to NOR circuit 154 and an input to NAND circuit 159 whose output provides an input to NAND circuit 166 and also provides the other input to NAND circuit 158, the combination of NAND circuits 158 and 159 provides a latch.

The output of NAND circuit 167 provides one input to NAND circuit 168 whose other input is provided by the output of NAND circuit 170. The output of NAND circuit 168 provides the other input to NAND circuit 170 and also provides one input to AND circuit 171. The combination of NAND gates 168 and 170 provides a second latch circuit.

The output of Nor circuit 169 is inverted through inverter 172 and provides the other input to AND circuit 171 whose output on line 183 is the DATA CLOCK signal which is inverted through inverter 186 and inverted again through inverter 187 and then provides the clock input to each of flip-flops 183, 184 and 185. Line 183 also is an input to inverter 189 whose output directly provides the clock input to flip-flop 194 and also is inverted through inverter 190 and provides the clock input for flip-flops 191, 192 and 193, respectively.

The Q output of flip-flop 183 provides the D input for flip-flop 183 whose Q output provides the D input for flip-flop 185. The Q output of flip-flop 185 is the DECODED DATA which is provided on line 38 to serial-in, parallel-out circuit 27 of FIG. 2. The data clock signal on line 183 provides one input to AND circuit 188 whose other input is provided by the Q output from flip-flop 194. The output of AND circuit 188 is the clock provided on line 37 to circuit 27 of FIG. 2. The Q output of flip-flop 194 also provides the data active signal on line 36, also to the circuit 27 of FIG. 2. The Q output of flip-flop 191 provides the D input of flip-flop 192; the Q output of flip-flop 192 provides the D input of flip-flop 193; the Q output of flip-flop 193 provides the D input of flip-flop 194.

Preferred Mode Operation of the Telemetry Interface

For an understanding of the operation of the telemetry interface, refer to FIGS. 1, 2, 9, 10, 11, 12a and 12b, 13a and 13b, and 14. Command data signals come in parallel from the controller module 16 on lines 30 to the parallel-in, serial-out register 24. In this preferred embodiment, the command word is 20 bits long. The register 24 is set to receive the command data word by the sync pulse on line 31 from the controller module 16. Encoder 26 delivers one clock pulse on line 132 to gate in the command word. The sync pulse on line 131 then disappears and from that point on, the bits in register 24 are serially shifted out on line 34 to encoder 26 every time a CLOCK REG. pulse on line 132 triggers register 24.

Encoder 26 then receives the bits in serial fashion from line 34 and proceeds with encoding a word for delivery to output fiber 41. The digital data may be encoded in one of several ways. The invention is, of course, not limited to the coding, but may use any available coding, such as Miller code, NRZI, by-phase and phase encoding. In phase encoding, a transition from OFF to ON represents a "1". A transition from ON to OFF represents a "0". Phase encoding is relatively simple to decode, but has the disadvantage of requiring a transmission line of maximum frequency response equal to that of the data bit rate.

In this preferred embodiment, phase encoding was selected because of its advantage of being easy to decode and the fact that the fiber optic cable is capable of transmitting very high frequencies and therefore able to accept the digital bits in the phase encoded formats.

Figure 8:
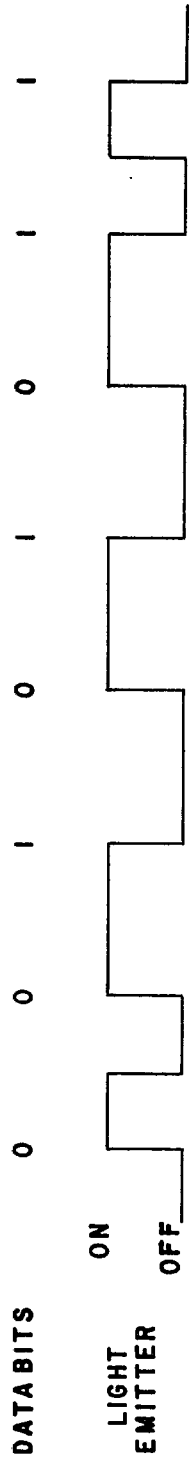
FIG. 8 is a diagram illustrating the type of encoding used in the inventive system.

FIG. 8 illustrates phase encoding with the binary bits to be encoded shown in the top line entitled "DATA BITS". The second line illustrates the output of a light emitting diode going from OFF to ON with a transmission from ON to OFF representing a binary "1". The time between two bits is known as a bit time. The bit is written at the beginning of the bit time. The first "0" requires a transition from OFF to ON. The next bit is also a "0" which requires an OFF to ON. There must be a transition from ON to OFF at the mid-bit time to make it possible to encode another "0". The second "0" is encoded by an OFF to ON transition. The next bit is a "1". The light emitting diode is in the ON state and there will be no need for a transition at the mid-bit time. An ON to OFF transition encodes the "1". The next bit is a "0". There is no transition at the mid-bit time. The process continues until the next to the last bit, which is a "1", so an OFF to ON transition is made at the mid-bit time. A transition always occurs at a bit time period. This enables the data received to be self-clocking. As seen from FIG. 8, a transition may or may not occur at the mid-bit time, but the receiver for receiving the information must be capable of determining which transitions are at the bit times to be able to interpret and receive the data and to ignore the mid-bit time transitions.

To accomplish this, a preamble of a known bit pattern is transmitted prior to the transmission of the data. The preamble permits the receiver to get into synchronization with the data to be received. In this preferred embodiment, the preamble is a series of "0's" followed by a single "1". The repetitive "0's" permit synchronization. The "1" indicates the completion of the preamble. The next bit detected will be a data bit. A long preamble provides greater assurance of obtaining synchronization but reduces the time available for transmitting data bits. The use of a short preamble runs the risk of not obtaining synchronization but makes more time available for transmitting data bits. In the preferred embodiment, the preamble is four "0's" followed by a single "1". The preamble is shown on line 5 of FIG. 10 and the description of the operation of the encoder 26 illustrates the use of the preamble.

Again referring to FIG. 10, the output of clock 110 from FIG. 9 is shown in line 1. The frequency of this clock is twice the data bit rate. The second line shows the START pulse which is developed on line 133 of FIG. 9. The START pulse must go to a "1" to start writing the preamble and then go to "0" after the last data bit. When the START signal is "0", AND gate 115 is disabled providing a "0" into the clock input of flip-flop 111 and also providing a $\overline{S}$ input to flip-flop 111 causing it to be set, thereby providing a "1" output on line 128 and a "0" output on line 129. This combination enables NAND gate 119 and disables NAND gate 120. When the START pulse goes to "1", the clock pulse on line 1 will be applied to the clock input of flip-flop 111. With the $\overline{Q}$ output on line 129 tied back to the input of flip-flop 111, its outputs on Q and $\overline{Q}$ toggle at half the clock rate as shown on lines 3 and 4 of FIG. 10 where the BIT CLOCK pulse train is one line 128 and the SHIFT CLOCK pulse train is on line 129 of FIG. 9. When the BIT CLOCK on line 128 is "1", gate 119 is enabled as indicated above and a transition at the bit time is encoded. When the SHIFT CLOCK is "1" on line 129, NAND gate 120 is enabled and a transition at the mid-bit time can be encoded. Shift register 127 is originally reset so that its output to the inputs of each NAND gates 118 and 124 is "0" forcing the output of both of those gates to be "1" which in turn forces the output of NAND gate 125 to be "0". This then is as though a "0" input had been presented on line 34. This is the first bit of the preamble to be presented as ENCODED DATA one line 130.

Figure 10:
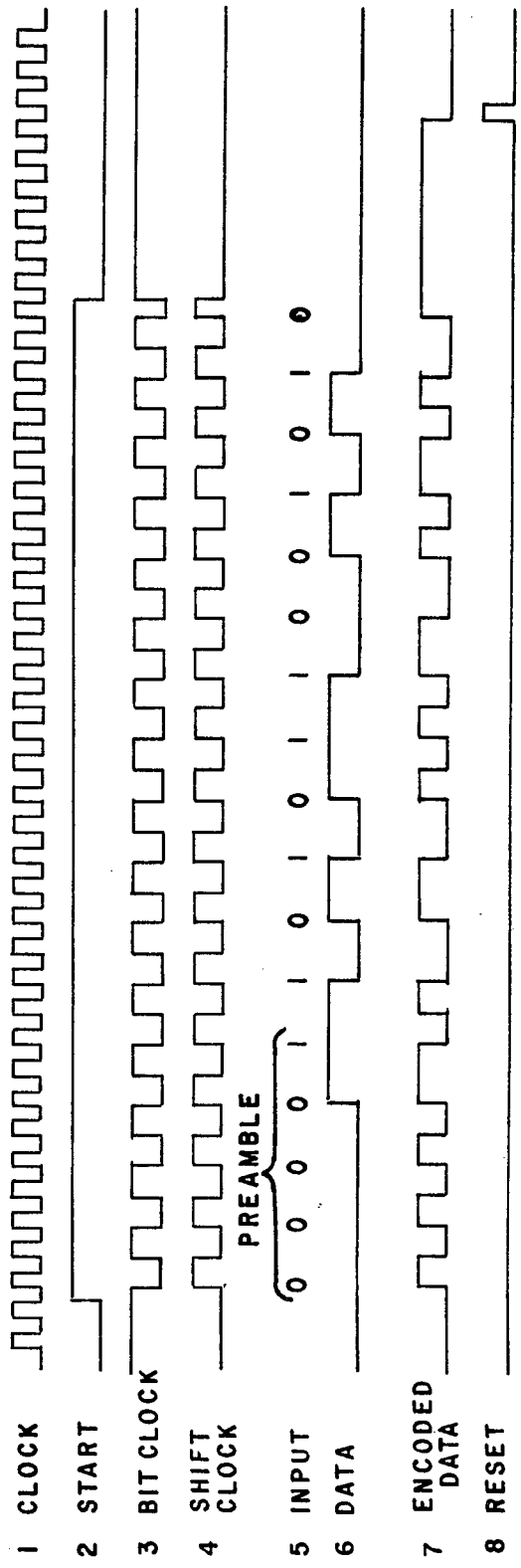
FIG. 10 is a diagram illustrating the timing and other signals relating to the operation of the apparatus of FIG. 9.

The first clock pulse that occurs after the START pulse goes to a "1" causes the bit clock to go to "0", the SHIFT CLOCK to go to "1" and the Q output of flip-flop 112 to go to "1", which further causes the ENCODED DATA output on line 130 to go to a "1" as indicated in line 7 of FIG. 10. The "1" on SHIFT CLOCK line 129 of FIG. 9 also clocks the shift register 127, causing its No. 1 output to go to a "1", indicating that the first "0" of the preamble has been encoded.

The "1" on SHIFT CLOCK line 129 into the D input of flip-flop 111 causes the flip-flop, on the next clock pulse, to provide a "1" output on BIT CLOCK line 128 and "0" output on SHIFT CLOCK line 129 so that the next "0" of the preamble will be encoded. The next clock pulse again causes the ENCODED DATA line 130 to go to a "1", the BIT CLOCK output on line 128 to go to "0" and the SHIFT CLOCK output on line 129 to go to "1". The "1" on line 129 clocks the shift register 127 and output No. 2 goes to a "1", indicating that the second "0" of the preamble has been encoded. This procedure proceeds through the fourth "0" of the preamble in exactly the same manner as described above. At this point, however, output No. 4 of shift register 127 also goes to a "1", providing a "1" input to each of NAND gates 118 and 124. Output No. 5 of shift register 127 is still "0", but the output of inverter 123 is a "1" so that NAND gate 124 now has each input a "1" causing its output to be a "0", forcing the output of NAND gate 125 to be "1" which is the condition for encoding the "1", the last bit of the preamble. The D input of flip-flop 112 will be "0" and consequently ENCODED DATA on line 130 will also be "0".

FIG. 10 illustrates the DATA INPUT on line 6 being a "1" and the encoded data on line 7 then going to a "0". Also, in the same fashion as indicated above, the shift register 127 is again clocked by the "1" on SHIFT CLOCK line 129 causing output 5 to also go to a "1", providing a "0" input from inverter 123 into the NAND circuit 124. The output of NAND gate 124 then is forced to a "1". One input of NAND gate 118 and 125 are each "1", enabling both of those NAND gates and causing them to function as inverters, dependent upon the incoming data one line 34. The data input now appears on the output of NAND gate 125, with the first bit being a "1" as shown in line 5 of FIG. 10. A "1" causes the ENCODED DATA output on line 130 to go to "0" as shown in line 7 of FIG. 10. Also, the shift register 127 is again clocked, as described above for the preamble bits, to cause output 6 to become a "1", enabling AND gate 126 whose other inputs are the START pulse on line 133, which is a "1", and the SHIFT CLOCK pulse on line 129. With the SHIFT CLOCK a "1", the output of AND gate 126 is a "1" and the output of OR gate 121, the CLOCK REG. signal on line 132 is also a "1". The CLOCK REG. pulse is connected via line 132 to the parallel-in, serial-out circuit 24, shifting the next command bit to the encoder 26. OR circuit 121 also permits applying the LOAD CLOCK pulse on line 33 at the appropriate time to parallel load circuit 24 of FIG. 2.

Each time a bit is encoded, the SHIFT CLOCK line 129 goes to a "1", causing a CLOCK REG. pulse to shift up another command bit. The process continues until all command bits have been encoded. The START pulse goes to a "0" causing the BIT CLOCK line 128 to go to a "1" and the SHIFT CLOCK line 129 to go to a "0". No more transitions will occur. The output EN- CODED DATA on line 130 is held for a predetermined time until the RESET pulse on line 32 from the controller module 16, as shown on line 8 of FIG. 10, is transmitted. In this particular embodiment, 3 bit times are chosen for a holding period. The FORCE-ON switch SW17 can be switched to cause a "1" on the ENCODED DATA line 130 for testing purposes. Also, this FORCE-ON switch also is used to produce a wide pulse as a data sample start command to the DAU's.

Please note that in line 5 of FIG. 10, twelve command bits are shown following the preamble bits. This is for purposes of illustration only and in this preferred embodiment, the number of command bits is 20 in addition to the preamble bits. This size of the command word is, of course, a design choice.

Referring again to FIG. 2, it can be seen that the output from the encoder on line 130 carrying the ENCODED DATA signals is applied to the amplifier 39 whose output is used to drive the light emitting diode CR4. The type of light emitting diode that is used is not critical, but is should produce a wavelength of light that is close to the minimum attenuation wavelength of output fiber 41, approximately 8200 angstroms.

Data or status signals from the DAU's enter on input fiber 40 and are coupled through pin diode CR3 into a high gain voltage comparator 22. Assume that there is no signal on input fiber 40 and therefore pin diode CR3 appears as an open circuit. The output feedback of comparator 22 through resistor R1 provides 100% inverter feedback under these conditions, making the voltage at the inverting output equal to the voltage of REF. 1. This causes a reverse biasing of the pin diode CR3. When light strikes diode CR3, a current flows as supplied through resistor R1. This causes the output of comparator 22 to move positively to maintain the voltage across diode CR3 at essentially REF. 1.

The output of comparator 23 is constrained to zero volts to represent a "0" and +5 volts to represent a "1". When the output of comparator 22 is well below REF. 2, the output of comparator 23 will be a "0". As the output of comparator 22 moves positively in response to light striking diode CR3, the output of comparator 23 remains a "0" until the output of comparator 22, divided by the resistor R2, R3 divider, causes the noninverting input of comparator 23 to become more positive than REF. 2. The output of comparator 23 will then start to move in a positive direction. Resistor R3 provides positive feedback. The output of comparator 23 will very quickly switch from a "0" to a "1" because of the very high gain achieved with the positive feedback. When the output from comparator 22 begins to fall, the output from comparator 23 remains at +5 volts until the output from comparator 22 is below the amplitude REF. 2 to the extent that the resistor R2, R3 divider causes the voltage on the noninverting input of comparator 22 to be negative with respect to REF. 2. The output of comparator 23 in switching from a "1" to a "0", the input voltage required is less than when switching in the other direction from "0" to "1". This addition of hysteresis reduces the likelihood of switching due to noise and assures fast switching. Diodes CR1 and CR2 protect the voltage comparator from excessive overload when in either the "1" or the "0" states.

Refer now to FIGS. 12a–12b for an understanding of the operation of the decoder 25 of telemetry interface 15 of FIG. 2. The function of decoder 25 is to interpret the transitions received from comparator 23 on line 28 as binary "1's" and "0's". The decoder 25 starts in an unsynchronized state and must recognize the "0's" in the preamble, block out the SHIFT CLOCK transitions, recognize the "1" as the preamble end, stay in sync if a few transitions are missed and recognize three missing transitions as the end of data. A transition at a bit time from OFF to ON represents a "0". A transition from ON to OFF represents "1". The first portion of the preamble has only "0's" since the encoder of each DAU is substantially identical to encoder 26 of the telemetry interface 15. The ENCODED DATA output from the DAU is in exactly the same format as out of encoder 26. Therefore, an ON to OFF transition simply reflects the change in the SHIFT CLOCK output and the decoder 25 must recognize such a transition and discard it. An OFF to ON transition temporarily sets sync (an ON to OFF transition resets sync). When sync is set, any transitions are blanked out for 75% of a bit time. A time window opens to receive transitions for 50% of a bit time. Therefore, the next transition can be accepted if it arrives between 75% and 125% of a bit time, allowing a margin of plus or minus 25% time error. When two consecutive zeros have been received, sync is permanently set. Recognition of the "1" at the end of the preamble starts the transfer of data or status.

Data or status enters decoder 25 on line 28 and the signal is applied to both inputs of exclusive OR circuits 153 and 160, but in each case the application of the second input is delayed by an RC time constant. This provides a "1" output from exclusive OR circuit 153 for a short period of time at each transition. In the case of exclusive OR circuit 160, the output pulse is of a shorter duration than that from exclusive OR circuit 153. With the $\overline{\text{sync}}$ equal to "1", AND gate 161 is enabled. A "1" from exclusive OR circuit 160 causes a "1" output from AND gate 161 which is applied as an input to NOR gate 169, ultimately providing a data clock pulse. Also, the outputs of inverters 162 and 164 then go to "0", triggering one-shot 174 and resetting one-shots 176–180. At the end of the timed input pulse from exclusive OR gate 160, the output of inverter 162 goes to a "1", clocking flip-flops 155 and 156. An ON to OFF transition, indicating a "1", results in the $\overline{\text{Q}}$ output of flip-flop 155 becoming a "1", enabling one input of NAND gate 166. The latch made up of NAND gates 158 and 159 is in the "reset" state and therefore the output from NAND circuit 159 is a "1". The output of exclusive OR GATE 153 is still a "1", causing the output of NAND gate 166 to be a "0". This results in the resetting of one shots 174 and 175.

An OFF to ON transition, indicating "0" causes the Q output of flip-flop 155 to go to "1" which causes the $\overline{\text{sync}}$ signal from NOR gate 154 to go to "0" which results in disabling AND gate 161 via gates 163 and 165. No transition signals from exclusive OR gate 160 can now be passed via AND circuit 161. With a "0" input, one-shot 174 triggers and therefore its Q output is a "1" for its adjustable, predetermined time, which in this preferred embodiment, is three-fourths of a bit time. When it times out, it triggers the adjacent one-shot 175 whose Q output goes to a "1" for one half a bit time during which gate 161 is again enabled because of the "1" output of one-shot 175 being one input to NOR circuit 165. If a transition is received in that one half bit time, one-shot 174 is triggered, one input of NOR gate 169 goes to a "1" to provide a data clock pulse and one-shots 176–180 are reset.

If a transition is not received during that one half bit time, the Q output of one-shot 175 goes low, triggering one-shot 176 which also has a pulse duration of one half of a bit time, as do one-shots 177–179. One-shot 180 has a minimum internal pulse time of the one-shot. When the Q output of one-shot 176 goes to a "1", NOR circuit 169 provides a "0" out which is inverted by inverter 172 to provide a DATA CLOCK pulse. When the one-shot 176 times out, one-shot 177 is triggered which again enables AND gate 161 so that a transition can pass. This process continues through three missing transitions until one-shot 180 is triggered. Its Q output goes to "1" forcing a clock pulse through NOR circuit 169 and its $\overline{Q}$ output goes to "0". $\overline{Q}$ going back to a "1" at the end of the delay clocks flip-flop 181 whose D input is connected to ground, thereby causing the Q output of flip-flop 181 to go to "0". This MASTER RESET resets the latches, flip-flops, etc. so that the decoder is ready for a new transition. Note that three bit times without a transition assumes no data and therefore the circuitry is prepared for subsequent data.

Figure 13A:
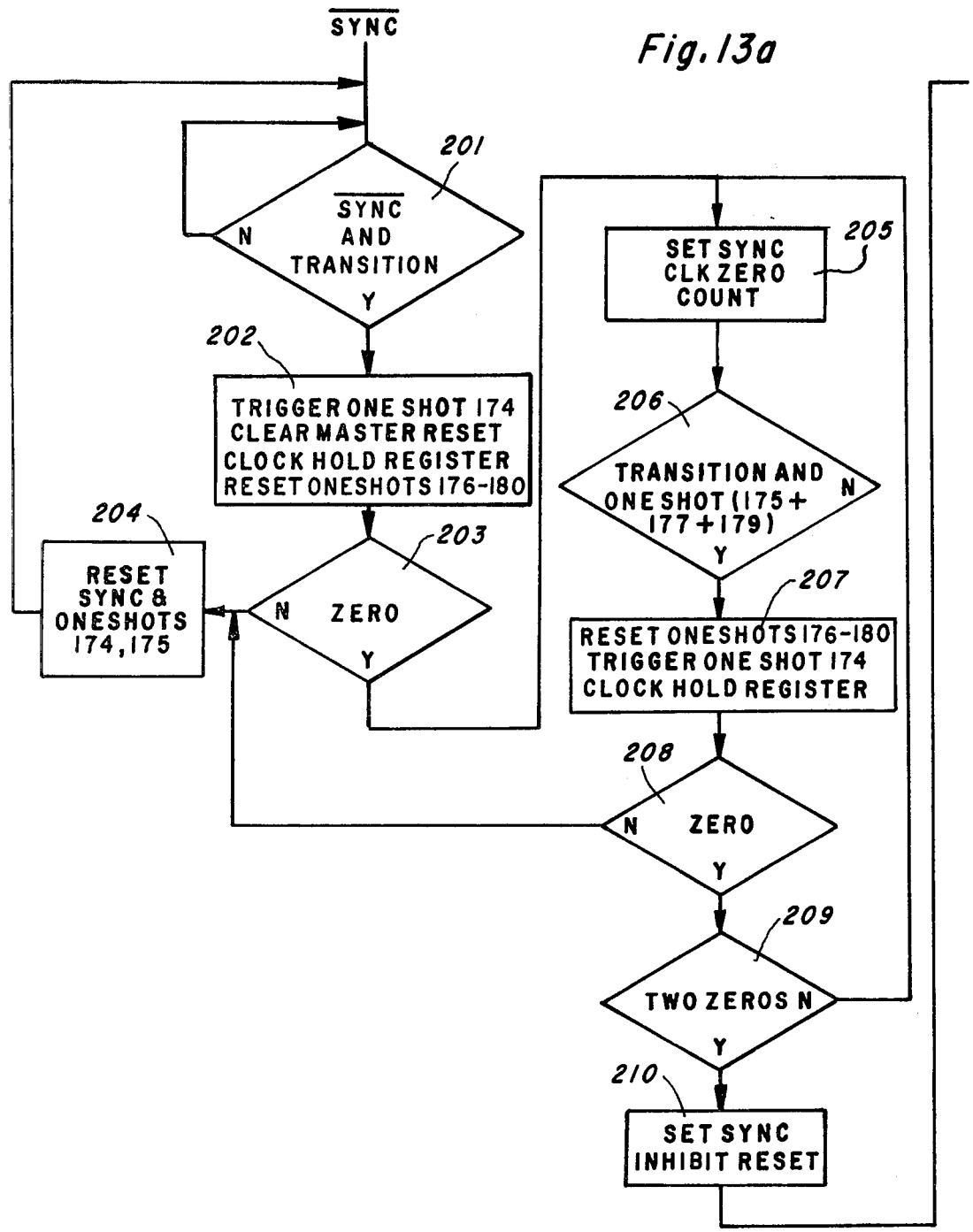
FIGS. 13a-13b make up a flowchart representing and describing the operation of the decoder of FIGS. 12a-12b.
Figure 13B:
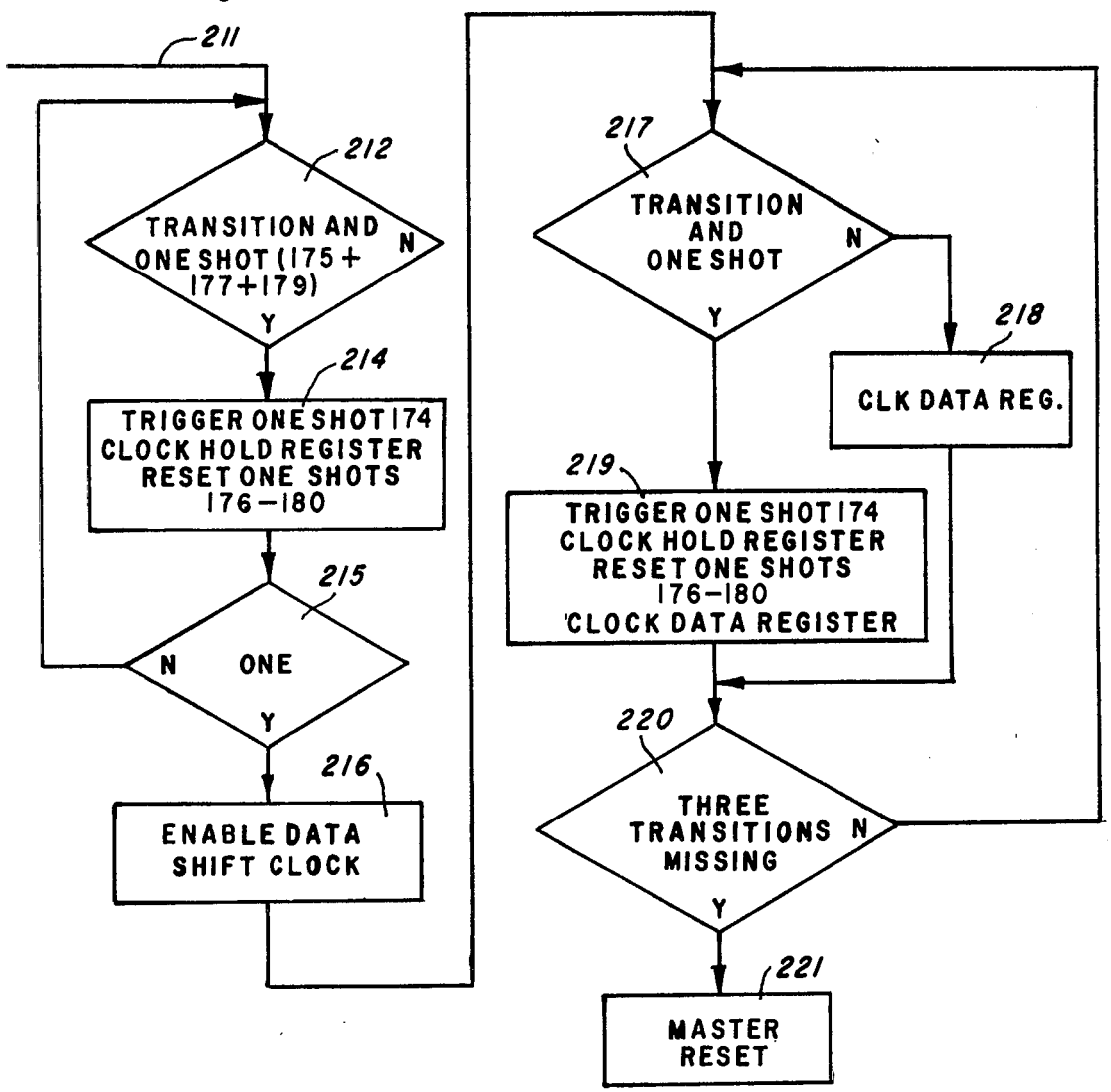

For help in understanding the operation of this circuit, refer to FIG. 13a–13b. This flowchart describes the sequence of events that occur because of the interaction of the hardware of FIG. 12a–12b. In this flowchart description, flip-flop 155 is referred to as the "hold register", the combination of flip-flops 155 and 156 forming shift register known as the "0" counter, the data shift clock is the output pulse from AND circuit 188 shown on FIG. 12b and the data register is shift register 145 of FIG. 11. The $\overline{Q}$ output of flip-flop 155 represents the DATA input, as will be made evident.

At the start of the operation, the registers and flip-flops, as indicated above, have been reset and therefore $\overline{sync}$ is a "1". Beginning at the top of FIG. 13a, at block 201 $\overline{sync}$ equal to "1" and a transition condition is queried. If not, the circuit waits for a transition period. If the answer is "yes", as indicated in block 202, one-shot 174 is triggered, master reset is cleared (placing a "1" on line 184) hold register 155 is triggered, and one-shots 176–180 are reset.

At block 203, a determination is made as to whether the transition represents the "0" (OFF to ON) or a "1" (ON to OFF). If it is not a "0", then a block 204, sync is reset and one-shots 174 and 175 are reset. The Q output of hold registe 155 is a "0", keeping the $\overline{sync}$ at a "1" level.

If the transition was a "0", then sync is set and the "0" counter is clocked. This indication that hold register 155 is set so that its Q output is a "1" which forces sync to a "0". Q = 1 indicates one "0". The transitions are blocked because, and gate 161 is disabled since, the Q output of one-shots 175, 177 and 179 are all equal to "0". Moving to block 206, inquiry is made as to whether there is a transition and whether any of the Q outputs of one-shots 175, 177 or 179 equal "1". If the answer is no, nothing happens until there are three missing transitions and the master reset is set. If the answer is "yes", then as indicated at block 207, one-shot 174 is triggered, one-shots 176–180 are reset and hold register 155 is clocked. At block 208, a determination is made as to whether the transition is a "0". If not, sync is reset and one-shots 174 and 175 are reset as indicated at block 204 and nothing occurs until three missing transitions and the master reset is set.

If the answer is "yes", then at block 209, the further question is asked as to whether there had been two consecutive zeros. If the answer is "no", then $\overline{sync}$ is set and the "0" counter is clocked as indicated in block 205. If the answer is "yes", then the sync is set and the sync reset is inhibited as indicated at block 210. When two consecutive "0's" have been received, both inputs of NAND gate 157 equal "1", setting the latch comprised of NAND gates 158 and 159. With the output of NAND gate 158 equal to "1", NAND gate 154 is enabled, forcing its output ($\overline{sync}$) to a "0". Sync cannot be reset.

Proceeding on line 211 of FIG. 13b and into block 212, the query is made as to whether there is a transition and whether the Q output of any of one-shots 175, 177 or 179 equal "1". If the answer is "n", the system waits until the answer is yes, or until three missing transitions set the master reset.

If the answer is "yes", then as indicated at block 214, one-shot 174 is triggered, hold register 155 is clocked and one-shots 176–180 are reset.

Proceeding to block 215, if the transition is not a "1", then the loop is back to block 212, awaiting the next transition until a "1" occurs. If the answer is "yes", then the data shift clock is enabled as indicated at block 216.

At block 217, the question is asked whether there is a transition and whether one-shot 175, 177, or 179 is set. If the answer is "no", the procedure is to clock data register, as indicated at block 218, when one-shot 176, 178 or 180 is triggered.

If the answer is "yes", the process is to trigger one-shot 174, clock the hold register, reset one-shots 176–180 and clock the data register. Proceeding to block 220, the question is asked whether there have been three missing transitions. If the answer is "no", the process loops back to block 217 and continues until three transitions have been missing. At that point, the process will proceed to block 221 where the master reset is set, clearing all flip-flops, latches, registers, etc.

Three missing transitions indicate the end of data and sets the master reset. Data which flows on the $\overline{Q}$ output of flip-flop 155, connects to the D input of flip-flop 183. Flip-flops 183–185 form a three-bit shift register. The output decoded data on the Q output flip-flop 185 is sent via line 38 to the circuit 27 of FIG. 2. The purpose of flip-flops 183–185 is to delay the data three bit times.

Flip-flops 191–194 form another shift register except that the last flip-flop 194 is clocked when the clock goes to a "0". The D input of flip-flop 191 is set at a "1" and therefore at the third clock pulse, the Q output of flip-flop 193 goes to a "1". When the clock returns to a "0", the Q output of flip-flop 194 goes to a "1", indicating that DATA is active as sent out on lines 36 and enabling AND circuit 188 to provide the data SHIFT CLOCK as mentioned above on line 37.

In this preferred embodiment, the preamble is five bits and recognition of two successive "0's" will result in synchronization. Under difficult transmission conditions, a long preamble and recognition of more than two successive "0's" will improve reliability.

FIG. 11 shows the DECODED DATA on line 38 connecting to the serial input of serial-in, parallel-out shift register 145. All of the data/status bits arrive in one continuous stream. It is necessary to count the bits as they arrive so that the bits may be organized as a parallel word. The counter 147 is clocked by the clock input on line 37 from the decoder 25 and is reset by a "1" on inputs R1 and R2 from NAND circuit 150.

When the DATA ACTIVE line 36 is at a "0", the shift register 145 and the counter 147 are kept in the reset state. When the DATA ACTIVE line 36 goes to a "1", the operation of the circuit begins.

Each clock which is input on line 37 shifts one bit of data into the shift register 145 and advances counter 147 one count.

NAND gate 146 decodes the counter 147 for a count of 20. Count 16 and count 4 each equal to "1" make NAND gate 146 output equal "0", triggering one-shot circuit 142 which is timed to provide a pulse that is ¼ of a bit time. This delay is designed into the system to permit the shift register 145 to stabilize after the last shift. When the $\overline{Q}$ output of one-shot 142 goes back to a "1", the data/status register 141 is clocked. When the Q output of one-shot 142 goes back to a "0", one-shot circuit 143 is triggered. One-shot circuit 143 also has a pulse duration of ¼ of a bit time. The $\overline{Q}$ output of 143 goes to a "0", resetting the counter to a count of "0". This reset enable pulse from one-shot 143 is gone one half of one bit time before the next clock is expected.

This process continues as long as data is being received on the telemetry line. The parallel data lines 151 from the data/status register 141 connect to the controller module 16, which is set to receive the data or status.

After the last data/status bit is received, the DATA ACTIVE line 36 goes to a "0", resetting both shift register 145 and counter 147 in preparation for the next data stream.

The circuit of FIG. 11, in this preferred embodiment, is repeated four times for the four lines mentioned earlier. Of course, the invention is not restricted to that number of lines.

The Data Acquisition Unit

Figure 3:
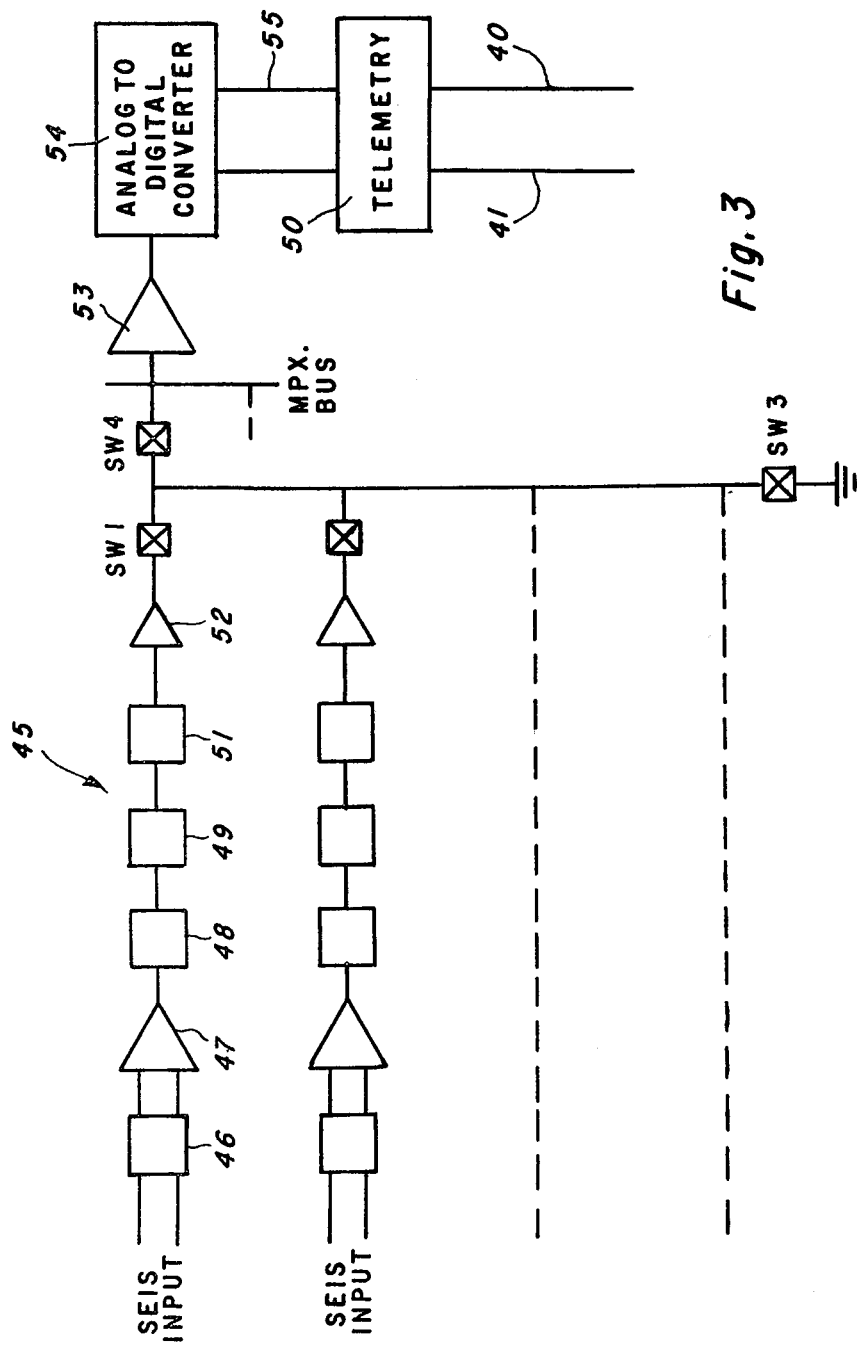
FIG. 3 is a block diagram of a portion of a DAU of FIG. 1.

FIG. 3 illustrates a seis input from two of the transducers 12 connected to a common DAU 11. The seis input comes into line filter 46 whose outputs are connected to the inputs of preamplifier 47. The output of preamplifier 47 is connected to the input of low cut filter 48 whose output is connected to the input of high cut filter 49 which has its output connected to the input of notch filter 51. The output of notch filter 51 provides the input to low drift amplifier 52 whose output is connected to switch 4 through switch 1 and ultimately to floating point amplifier 53. Other transducers connected to the same DAU are connected through switch 4 to the common floating point amplifier 53 whose output is converted from analog to digital by way of A to D converter 54.

The line filter 46 and preamplifier 47 combination are described in U.S. Pat. No. 3,972,020 and the floating point amplifier 53 is described in U.S. Pat. No. 3,684,968. The entire acquisition portion of FIG. 3, except for the telemetry unit 50 and fiber optic cables 40 and 41 is identified as Texas Instruments part No. TI-980800 which is fully described in the DFS V Manuals mentioned above.

Figure 4:
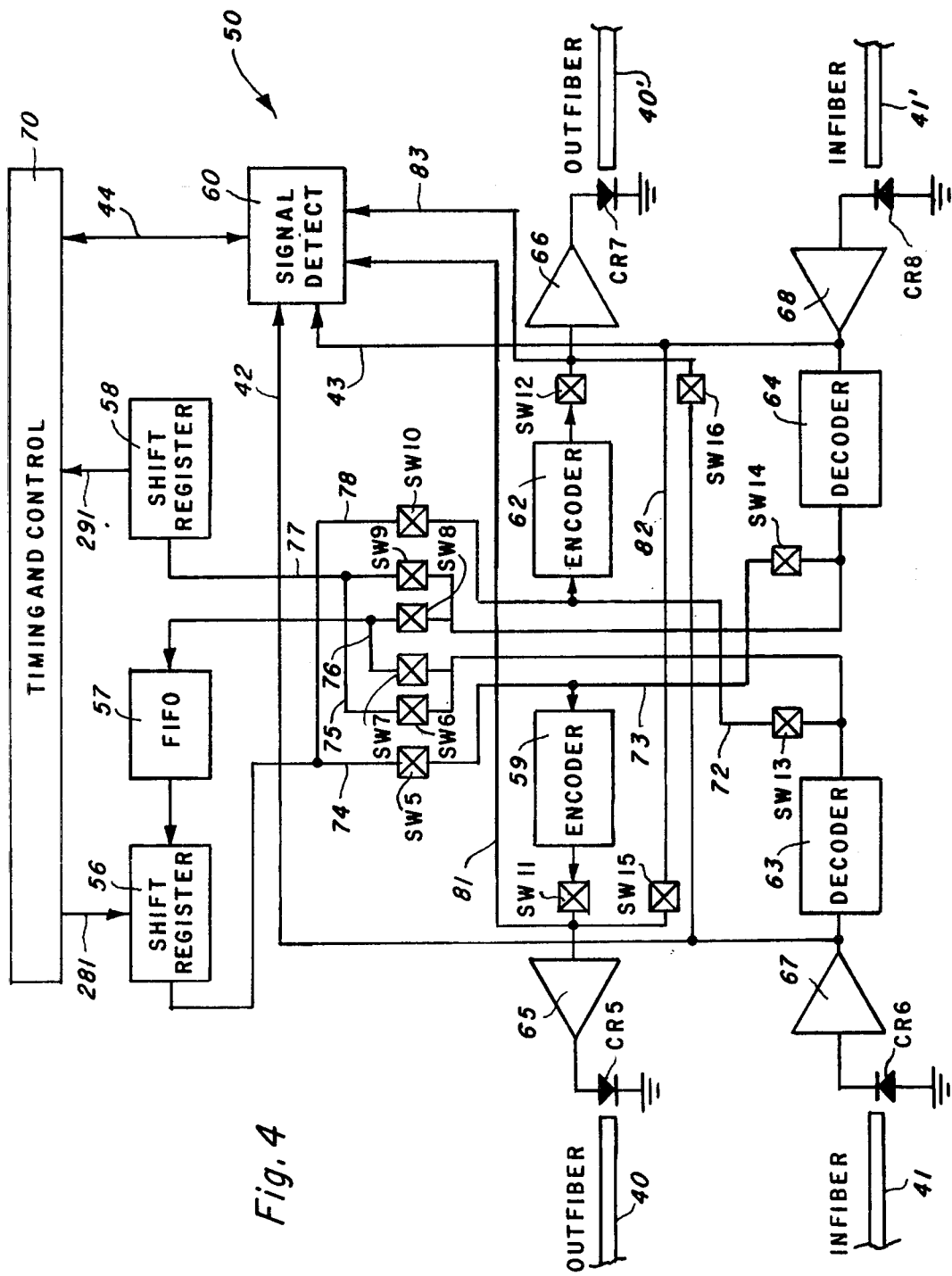
FIG. 4 is a block diagram of the telemetry communication section of the DAU of FIG. 1.

FIG. 4 should now be referred to for a detailed description of the telemetry unit 50 of FIG. 3. In-fiber 41 is connectable at photo diode CR6 or at photo diode CR8. The anodes of photo diodes CR6 and CR8 are connected to ground and their cathodes are connected to the inputs of amplifiers 67 and 68, respectively. These photo diodes may be pin diodes as in the telemetry interface 15 and the amplifiers 67 and 68 may be exactly the same as the comparators 22 and 23 and their associated circuitry as shown in FIG. 2. The outputs of amplifiers 67 and 68 each provide inputs on lines 42 and 43, respectively, to signal detect 60. They also provide inputs to decoders 63 and 64, respectively. Decoders 63 and 64 are schematically identical to decoder 25 as shown in FIG. 12a–12b.

The outputs of amplifiers 67 and 68 also are connected through switches SW16 and SW15, respectively, and through lines 83 and 81, respectively, as inputs to signal detect 60 and to the drive amplifiers 66 and 65, respectively. Drive amplifiers 65 and 66 are identical to drive amplifier 39 of FIG. 2.

The output of decoder 63 is connected through switch SW13 to the input of encoder 62 and through switch SW10 on line 78 to shift register 56. Its output is also connected through switch SW6 on line 75 to shift register 58 and through switch SW7 on line 76 to first-in first-out (FIFO) register 57.

The output of decoder 64 is connected through switch SW14 to encoder 59 and then through switch SW5 on line 74 to shift register 56. Its output is also connected through switch SW9, on line 77, to shift register 58 and through switch SW8 to FIFO 57.

The output of encoder 59 is connected through switch SW11 to the input of amplifier 65. The output of encoder 62 is connected through switch SW12 to the input of amplifier 66.

Timing and control 70 is connected to shift register 56 to shift register 58 and to signal detect 60. The output of FIFO 57 is connected to shift register 56.

FIFO register 57 is a Texas Instruments Type SN74S225 Asynchronous First-in, First-out Memory, which is described in the Texas Instruments Publication Bipolar Microcomputer Components Data Book, LCC 4270, dated January, 1977. The FIFO described is 16 bits long and can be cascaded for larger requirements.

Shift registers 56 and 58 are Texas Instruments Type SN74LS166 8-bit shift register, the same type as register 24 of FIG. 2. In this preferred embodiment, three units are cascaded.

Figure 17:
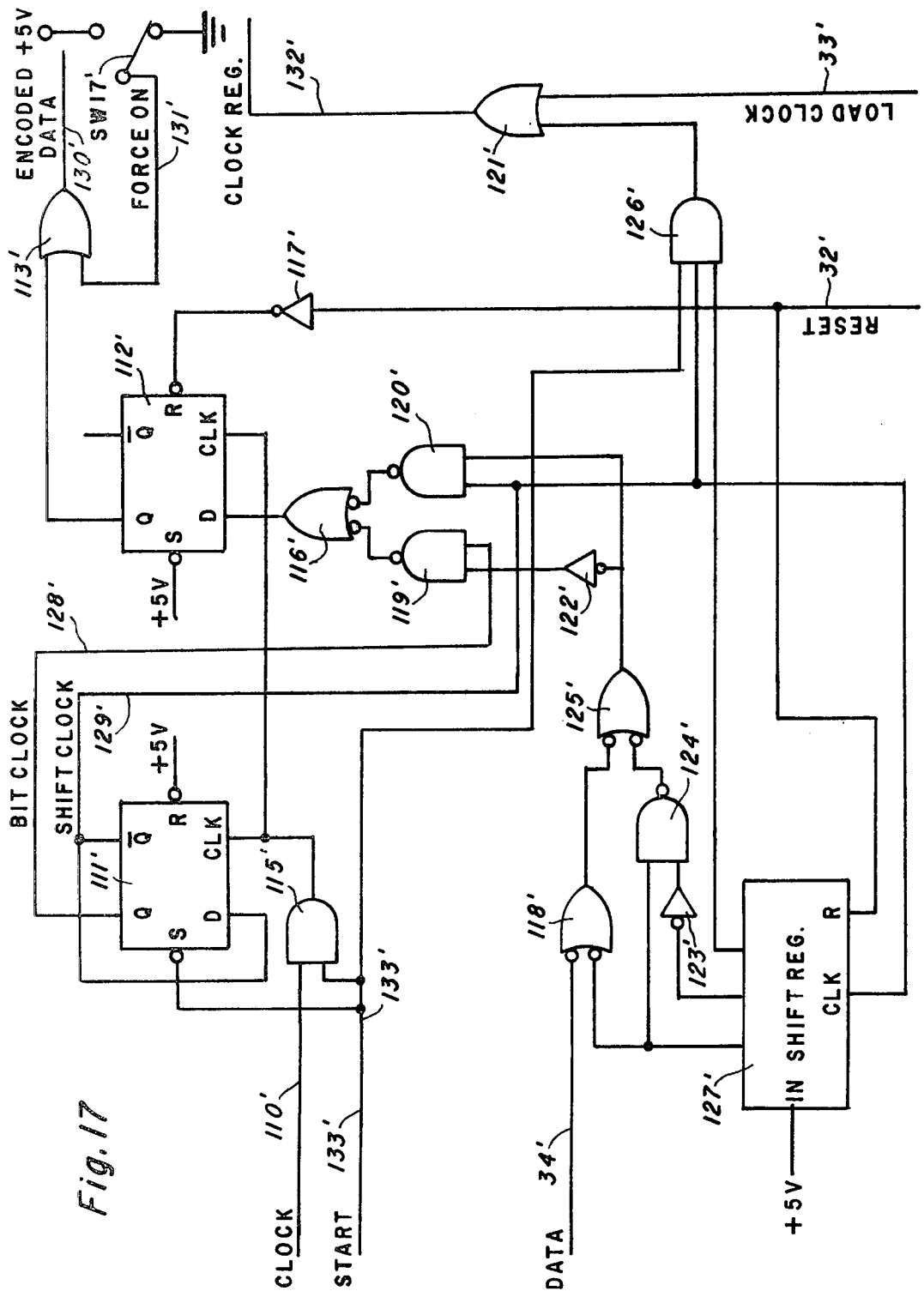
FIG. 17 is a schematic diagram of an encoder of FIG. 4.

FIG. 17 schematically illustrates the encoder 59 or 62 of FIG. 4. The CLOCK pulse is brought in on line 110' from crystal oscillator 270 of FIG. 18, the START pulse is brought in on line 133' from the output of NAND circuit 318 of FIG. 19, and the data or status is brought in on line 72 for encoder 62 and on line 73 for encoder 59. Referring back now to FIG. 9, it should be noted that the structure just recited for FIG. 17 is the only difference between the structure of FIGS. 9 and 17. The encoders are identical and therefore no more detailed description for 17 is necessary. The numerical designations in FIG. 17 are characterized with a ' to differentiate from the components of FIG. 9.

Figure 18:
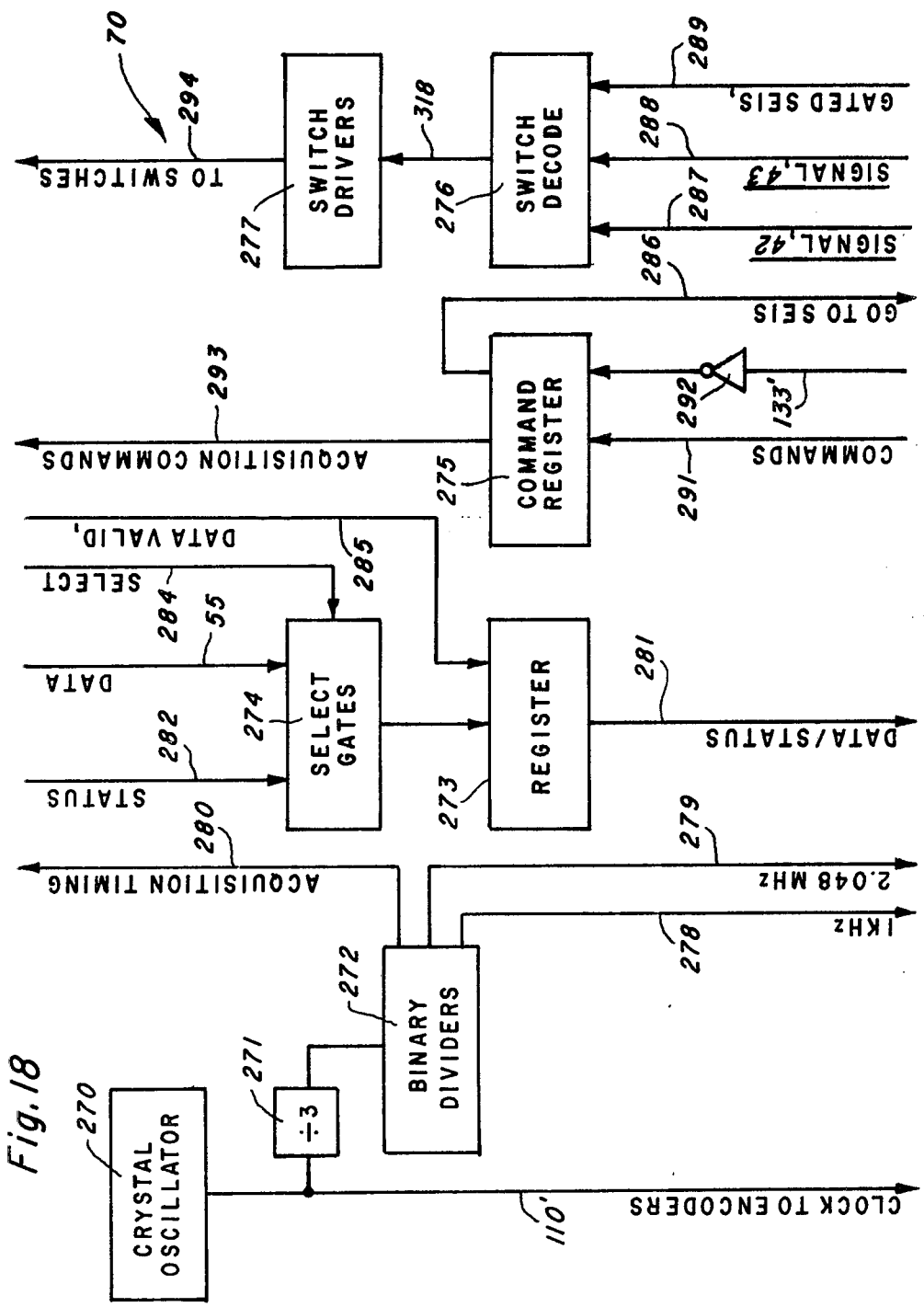
FIG. 18 is a block diagram of the timing and control of FIG. 4.

FIG. 18 is a block diagram of the timing and control 70 of FIG. 4.

The crystal oscillator 270 is the same as that used in the clock 110 of FIG. 9 and also operates at a frequency of 12.288 MHz. Its output goes to the encoders 59 to 62 on line 110' and also to divider 271 where the frequency is divided by three. Divider 271 is a Texas Instruments Type SN74LS293 4-Bit Binary Counter described in the TTL Data Book. Gated feedback shortens the count to obtain a "divide by three" function. Binary divider 272 is connected to the output of divider 271 and is also the TI Type SN74LS293, cascaded in three sections to obtain a minimum frequency of 1 KHz output on line 278. A frequency of 2.048 MHz is output on line 279 and acquisition timing as set out in the DFS V Manual for the data collection circuitry, as shown in FIG. 3.

STATUS signals are received on lines 282 from various points of the acquisition circuitry of FIG. 3 described in the DFS V Manuals listed above. The DATA signals come from the output of the analog-to-digital converter 54 of FIG. 3 on line 55. A SELECT signal on line 284, as previously mandated by an incoming command, is a "1" for status signals and is a "0" for data signals. The DATA VALID signal on line 285 comes from the A-to-D converter 54 of FIG. 3 upon completion of the conversion, and clocks register 273. Input lines 282 and 55 are inputs to select gate 274. The output of select gate 274 supplies the inputs of register 273 whose output is provided on line 281. The select gates are Texas Instruments Type SN74LS157 Quadruple 2-Line-to-1-Line Data Selectors/Multiplexers described in the TTL Data Book. The register 273 may be made up of Texas Instruments Type SN74LS174 Hex D-Type Flip-Flops as described in the TTL Data Book.

The COMMAND signals on line 291 from shift register 58 of FIG. 4 are inputs to command register 275. The start pulse on line 133' from the output of NAND circuit 318 is inverted through inverter 292 so that the end of the start pulse clocks the command register 275, sending ACQUISITION COMMANDS on line 293 to the acquisition circuitry of FIG. 3. The ACQUISITION COMMANDS are well known and include such commands as "starting the process" and "commanding the floating point amplifiers to gain ranging". The GO TO SEIS output command on line 286 from command register 275 is an input to the signal detect unit 60 of FIG. 19.

Figure 19:
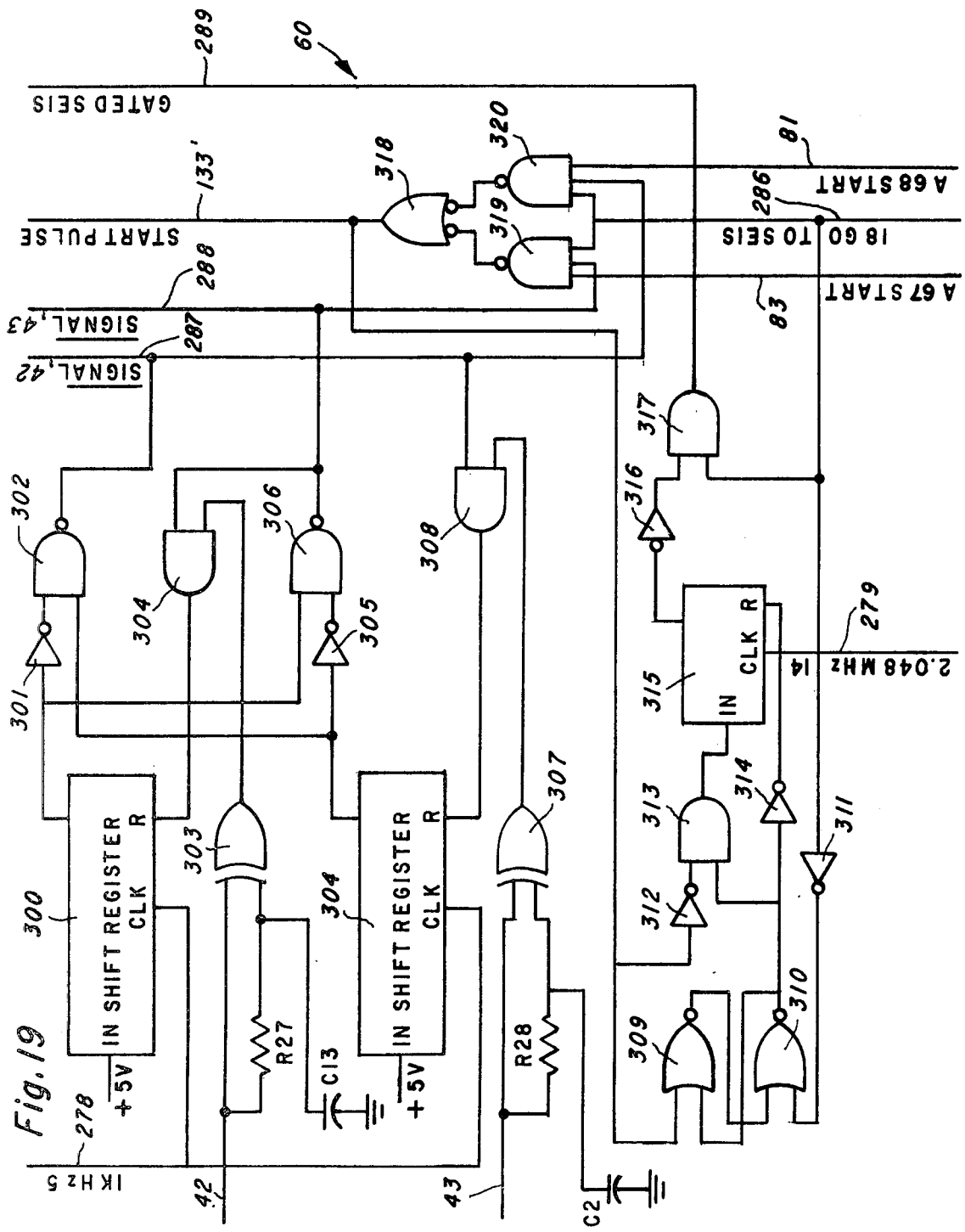
FIG. 19 is a schematic diagram of the signal detect circuit of FIG. 4.

$\overline{\text{Signal 42}}$, $\overline{\text{Signal 43}}$ and GATED SEIS on line 287, 288 and 289 from signal detect 60 of FIG. 19 are inputs to switch decode 276. Switch decode 276 in turn is an input to switch drivers 277 which, on output lines 294, selectively activate switches SW5–SW16 of FIG. 4. Switch decode 276 is simply a combination of gates that react to the inputs on lines 287–289 and may be a Texas Instruments Type SN74S138 Decoder/Demultiplexer described in the TTL Data Book. Switch drivers 277 provide a +12 volts DC output for a "0" input and −12 volts output for a "1" input.

FIG. 20 illustrates one switch and one switch driver. The switch is field effect transistor Q1 having its source and drain serving as the terminals of the switch. For example, if switch SW5 of FIG. 4 were the sample switch Q1, then the S terminal could be said to be connected to line 74 and the L terminal connected to line 73 of FIG. 4. The source of transistor Q1 is connected through resistor R30 to the gate. The gate of transistor Q1 is connected to the anode of diode CR14 whose cathode is connected to the cathode of diode CR15 and to the emitter of transistor Q2 whose collector is connected to −12 volts and whose base is connected to the anode of diode CR15 and through resistor R33 to −12 volts. The anode of diode CR15 is connected to the collector of transistor Q3 whose emitter is connected through resistor R31 to +12 volts. The base of transistor Q3 is connected to the anode of diode CR17 and through resistor R32 to the cathode of diode CR16 whose anode is connected to +12 volts. The collector of transistor Q3 is also connected to the anode of diode CR18 whose cathode is connected to the cathode of diode CR17. The collector of NPN transistor Q4 is connected to the cathodes of diodes CR17 and CR18, its base is connected to +5 volts, and its emitter is connected to the appropriate one of lines 318 from switch decode 276 shown in FIG. 18.

Refer now to FIG. 19 which illustrates the signal detect 60 shown in FIG. 4. Input line 42 is shown as one input to exclusive OR circuit 303 whose other input is connected through resistor R27 to input line 42 and through capacitor C13 to ground. Input line 43 is connected as one input of exclusive OR circuit 307 whose other input is connected through resistor R28 to input line 43 and also through capacitor C2 to ground. Line 278 carries a clock at one KHz from binary divider 272 shown in FIG. 18 and clocks shift registers 300 and 304, each of which are 8-bits long and comprised of one Texas Instruments SN74LS166. Shift register 315 is one SN74LS166.

The output of exclusive OR circuit 303 is one input to AND circuit 304 whose output is used as the reset input to shift register 300. The output of exclusive OR circuit 307 is one input to AND circuit 308 whose output is used to reset shift register 304. A "1" is impressed on the serial inputs of shift register 300 and 304 so that a "1" will propagate down the shift registers and appear at the output. The output of shift register 300 is inverted through inverter 301 and is an input to NAND circuit 302 whose other input is the output from shift register 300. The output of shift register 304 is inverted through inverter 305 and is one input to NAND circuit 306 whose other input is the output from shift register 300. The output of NAND gate 306 provides the other input to AND gate 304, provides one input to NAND gate 319 and provides $\overline{\text{SIGNAL 43}}$ output on line 288 to switch decode 276 of FIG. 18. The output of NAND gate 302 provides the other input to AND gate 308, one input to NAND gate 320 and $\overline{\text{SIGNAL 42}}$ output on line 287 to switch decode 276 of FIG. 18.

The A67 START signal on line 83 of FIG. 4 and signal A68 START on line 81 from FIG. 4 serve as inputs to NAND gates 319 and 320, respectively. The other input to each of NAND gates 319 and 320 is provided on line 286 and is the GO TO SEIS signal from command register 275 of FIG. 18. The outputs of NAND gates 319 and 320 are the inputs for NAND gate 318 whose output on line 133' is the START pulse output and which is one input to NOR circuit 309. The output of NOR gate 309 is one input to NOR gate 310 whose output is the other input to NOR gate 309, the combination forming a latch. The other input to NOR circuit 310 comes from input line 286, the "GO TO SEIS" signal which is inverted through inverter 311 and applied as the other input to NOR gate 310. The output of NOR gate 310 also is inverted through inverter 314 and connected to the reset terminal of shift register 315. The output of NOR gate 310 is one input to AND gate 313 whose output is connected to the serial input of shift register 315 which is clocked at 2.048 MHz on line 279 from FIG. 18. The output of NAND gate 318 is inverted through inverter 312 and is the other input to AND gate 313. The output of shift register 315 is inverted through inverter 316 and is one input to AND circuit 317 whose other input comes from line 286, the "GO TO SEIS" signal and whose output is the "GATED SEIS" signal on line 289.

Preferred Mode of Operation of the DAU

For an understanding of the operation of the DAU, refer to FIGS. 3, 4, 18 and 19. As indicated in the detailed description of the acquisition circuitry of FIG. 3, the circuit and its operation is detailed in the DFS V Manuals. Suffice it to say that a generally low energy seismic input signal is input to line filter 46, amplified in preamplifier 47 and filtered through low cut filter 48, high cut filter 49 and notch filter 51. The filtered and amplified signal from notch filter 51 is further amplified through low drift amplifier 52 and is selected by the multiplexer comprised of switches SW1, SW3 and SW4 and then sent to the floating point amplifier 53. It should be pointed out that in this preferred embodiment, there is a possible six acquisition circuits, as just described, one of which is selected by the multiplexer. However, less than six can certainly be used, and more circuits can be installed if more than six seis inputs for one DAU is required. It should also be pointed out that if only one seis input were required, there probably would be no real need for the line filter 46 and of course no need for the multiplexer.

The selected seis signal, amplified and filtered, is then sent to the analog-to-digital converter 54 which provides a digital representation of the analog signal input, sending that representation to the telemetry circuitry 50.

Refer now to FIG. 4. When the DAU is first deployed, it is not known whether in-fiber 41 or in-fiber 41' is ultimately connected to the master station. That is, a pair of fiber optic cables is available, one to be connected to receive commands from the master station or data from other DAU's, and the other to be connected to transmit data/status to the master station and any other DAU's before the master station. The choice of cable does not matter in the system as designed. For example, in FIG. 1, DAU 11' is shown with the fiber optic cable 20 returning to telemetry interface 15 coming from its left hand side and proceeding further out to other DAU's from its right hand side, unlike the other DAU's shown. The signal detect 60 determines which in-fiber 41 or 41' is receiving a command signal from the master station. The identity of the in-fiber 41 or 41' is sent by signal detect over lines 44 to timing and control 70. If signal detect 60 receives no signal for a time greater than 8 milliseconds, the DAU reverts back to a search mode to again identify which in-fiber has the command signal. If the signal is on in-fiber 41, switches SW13, SW12 and SW6 will close on command from timing and control 70. The incoming signal on in-fiber 41 is detected by photo diode CR6, amplified by amplifier 67 and decoded by decoder 63. The decoded output of decoder 63 passes through switch SW13 into encoder 62, where the information is again encoded, sent through switch SW12 to driver 66 which drives light emitting diode CR7, passing the encoded command on out-fiber 40' to the next DAU. The command is completely regenerated in the DAU. The generated command is timed by the DAU. Each DAU has a local crystal controlled oscillator 270 (FIG. 18) for timing. The crystal oscillator holds the timing very stable. There will, of course, be a small time skew between the DAU's and between the master station. This time skew causes no difficulty in the transmission of commands, status or data.

The output of decoder 63 also passes through switch SW6 on line 75 to shift register 58. The command is parallel transferred from shift register 58 to timing and control 70 over lines 291. If the command signal is on in-fiber 41', then switches SW14, SW11 and SW 9 will close and exactly the same events will occur but with the mirror image components.

Upon receiving the command, the timing and control 70 parallel loads the previous data/status into shift register 56 over lines 281. Data from the next DAU enters on in-fiber 41' which is coupled to photo diode CR8 which sends the data signal into amplifier 68. Amplifier 68 sends the signal into decoder 64 where it is decoded. For this operation, switches SW8, SW5 and SW11 are closed. The output of decoder 64, without the preamble of course is sent through switch SW8 serially into first-in, first-out register (FIFO) 57 where the information is shifted to the left until it is clocked out and into shift register 56. The purpose of the FIFO 57 is to store the bits in the event that the DAU is not ready to shift bits out of shift register 56. The FIFO 57 output connects to the shift register 56. The shift register 56 output goes to switch SW5 to encoder 59. As the contents of shift register 56 is shifted out, the contents of FIFO 57 is shifted into shift register 56 and the shifting continues until all of the bits are shifted into encoder 59 through switch SW5. FIFO 57 has an output ready line that is a "1" whenever data is in the last position. The output ready line goes to a "0" when the FIFO 57 is empty, indicating that all bits have been shifted out. The encoder 59 output is connected through switch SW11 to output driver 65 which drives LED CR5 and places the data/status on out-fiber 40. Note that the operation is a full duplex operation. This is, commands go in one direction while data/status go in the opposite direction.

It should be noted that the encoder 62, as well as encoder 59, operates in exactly the same fashion as does the encoder 26 of FIG. 2 described in detail earlier. Also, decoders 63 and 64 operate in exactly the same manner as decoder 25, whose operation was explained in detail earlier. The decoders 63 and 64 therefore strip off the preamble which is used by the DAU for synchronization in the same way as described earlier, and the encoder 62 or encoder 59 add the preamble. When data/status is coming from a number of other DAU's, however, only a single preamble is added with a series of data/status words following. If more than three transitions are missed, then an END OF DATA signal is sent to the timing and control 70 which switches the telemetry circuit back to the receive command mode.

Upon a command from the master station "GO TO SEIS" each DAU telemetry circuit switches to the command mode which causes the closing of only switch SW16 and then reacts to a START pulse. The START pulse is as shown in line 2 of FIG. 10. The master station waits a period of time equal to the START pulse length and then produces the pulse. The pulse is transmitted via amplifier 67 through switch SW16 into signal detect 60 on line 83 and signal detect 60 detects the leading edge. There a START pulse is generated and output on line 133' to control the operations within the DAU. The START pulse also passes through switch 16 and out through driver 66, LED CR7 onto out-fiber 40' to the next DAU.

The previous data word is clocked into shift register 56. The data is transmitted to the master station in exactly the same manner as was the status as discussed above. After the START pulse, the master station waits a time equal to the length of the START pulse and resumes sending commands. The trailing edge of the START pulse and the time delay at each DAU switch the telemetry circuitry back to that for receiving commands. The start command is repeated at intervals of ¼, ½, 1, 2, or 4 milliseconds, as desired, for the remainder of the recording.

Refer to FIG. 19 for a description of the operation of signal detect 60. Signals come from amplifier 67 or 68, depending upon which in-fiber has the command signal with the signal then coming in on line 42 or 43, respectively. Also, the signal comes from amplifier 67 on line 83 as an input or from amplifier 68 on line 81 as an input.

When a transition is received on line 42 or on line 43, the output of exclusive OR circuit 303 or that of exclusive OR circuit 307 goes high for a period of time determined by the RC delay on the other inputs of each of these circuits. In the absence of a signal, a "1" will propagate down each of shift registers 300 and 304 because the serial input of each is "1". Inverter 301 makes one input of NAND gate 302 equal "0" and the output $\overline{\text{SIGNAL}}$ 42 equal "1", enabling AND gate 308. Inverter 305 and NAND gate 306 makes $\overline{\text{SIGNAL}}$ 43 equal "1", enabling AND gate 304. When both AND gates 304 and 308 are enabled, the DAU is in the search mode.

Assume that a command signal is present on line 42. Register 300 will be reset, making both inputs of NAND gate 302 equal "1". Register 304 is not reset, keeping one input of NAND gate 302 equal to "1". NAND gate 302 provides a "0" output, indicating a signal present on line 42. The output of shaft register 300 being equal to "0" holds the NAND gate 306 output at "1". AND gate 308 is disabled and therefore shift register 304 cannot be reset as long as line 42 has a signal present. The circuit is latched up in this state. The opposite result would have occurred had line 43 received a signal. If line 42 stops receiving a signal, register 300 will no longer be reset. Eight clock pulses (8 milliseconds) are required to shift a "1" to the output of shift register 300, causing a "1" output from NAND gate 302 thereby putting the circuit back in the search mode.

For normal operation, assume a signal is present on line 42. One input of NAND gate 319 is "1" because of NAND gate 306 having a "1" output. NAND gate 320 is disabled due to NAND gate 302 having a "0" output. "GO TO SEIS" on line 286 equal "1" will enable another input of NAND gate 319. Amplifier 67 output connects to the third input of NAND gate 319. When the START pulse goes to a "1", it will pass through gates 319 and 318 on line 133'. The output of amplifier 68 of FIG. 3 connects to the third input of NAND gate 320

If "GO TO SEIS" equals "0", inverter 311 supplies a "1" to one input of NOR gate 310, making its output go to "0". This sets the latch comprised of NOR gates 309 and 310. When the output of NOR gate 310 equals "0", AND gate 313 is disabled and therefore the shift register 315 is reset, enabling AND gate 317. Shift register 315 is clocked at a frequency of 2.048 MHz on line 279. When "GO TO SEIS" equals "1" and gate 317 output equals "1", the "GATED SEIS" line 289 equals "1". When the start pulse at gate 318 output on line 133' equals "1", NOR gate 309 resets the latch, enabling AND gate 313, and removes the reset from the shift register 315.

When the start pulse goes to "0" and gate 313 output goes to a "1", a "1" input is provided for register 315. Four clock pulses are required to shift the "1" to the output of register 315, disabling AND gate 317, returning GATED SEIS on line 289 to "0". If "GO TO SEIS" equal "0", the latch comprised of NOR gates 309 and 310 is again set. The circuit waits for the next "GO TO SEIS" command.

Refer to FIG. 18 for an understanding of the operation of the timing and control 70 of FIG. 4 and its function in the telemetry circuit 50 of FIG. 3. The crystal oscillator 270, having a frequency of 12.288 MHz output on line 110' provides a clock input to encoders 59 and 62, shown in FIG. 17. This frequency is divided by three at divider 271 and is further divided by divider 272 to provide 1 KHz on line 278 and 2.048 MHz on line 279 to signal detect 50 as shown in FIG. 19. Also provided is acquisition timing on lines 280 to the acquisition circuitry of FIG. 3 as described in the DFS V Manuals.

Status information in the form of binary code comes from the acquisition circuitry of FIG. 3 in response to specific commands from the master station. DATA, on line 55, comes from the output of analog-to-digital converter 54 shown in FIG. 3. the SELECT signal, on line 284, when a "1", selects STATUS and when a "0", selects DATA. The data/status is gated into register 273 from select gate 274, and a DATA VALID signal on line 285 from the analog-to-digital converter 54 of FIG. 3, upon completion of the conversion, clocks data/status into register 273. The output DATA/STATUS from register 273 on line 281 is an input to shift register 56 as shown in FIG. 4. COMMANDS from the master station come in on line 291. Typical commands are:

TAKE A DATA SAMPLE
GO TO STAND-BY MODE
GO TO SEIS MODE
TURN POWER OFF
MEASURE DETECTOR ARRAY CONTINUITY
MEASURE BATTERY VOLTAGE
SEND STATUS

The "GO TO SEIS" command, in this preferred embodiment, relates to a single bit of the command word so if that bit equals "1", the GO TO SEIS line 286 is active and is an input to the signal detect 60 shown in FIG. 19. The other commands go out on line 293 to the acquisition circuitry where they are decoded and appropriately branched from the decoder. Details of such decoding may be seen in the DFS V Manuals.

SIGNAL 42, SIGNAL 43 and GATED SEIS are brought in on lines 287, 288 and 289, respectively, to switch decode 276. The switch decode decodes the input signals in a predetermined fashion and selects the various combinations of switches SW5–SW16, shown in FIG. 4 and described above, providing the various configurations for the telemetry circuit of each DAU. Switch drivers 277 provide the proper drive for the switches SW5–SW16.

Referring to FIG. 20, when a +5 volts is received on line 318, transistor Q4 is cut off and will hold transistor Q3 cut off as well. Under these circumstances, transistor Q2 conducts which causes conduction of diode CR14. The gate of transistor Q1 then goes to a negative potential nearing −12 volts, opening switch Q1. However, if a zero potential arrives on line 318, transistor Q4 is turned on, turning transistor Q3 on and transistor Q2 off. Under these conditions, diode CR14 is turned off and the gate of transistor Q1 then is at the source potential turning transistor Q1 on, or closing switch SW5.

General

FIG. 5 illustrates, in cross-section, optical fiber cable 20. Stress members 102 are embedded in housing 101. In-fiber 41 is shown positioned within a protective sleeve 103. Also shown is out-fiber 40.

With reference to FIG. 6, a longitudinal cross-section of a typical optical fiber such as in-fiber 41 is shown. Optical fiber 41 is comprised of a cladding fiber 105 and inner fiber 106.

In optics, the principles of refraction and reflection are well understood. The index of refraction, N, for a given material is given by the expression $N = C/V$ where C is the velocity of light in a vacuum and V is the velocity of light in the material. Light travelling in the material with an index N1 and striking an interface with another material with an index N2 will be refracted as it crosses the interface. If N2 is less than N1 and $\theta$ is the angle of the light rays with respect to a perpendicular to the interface, the emerging angle will be larger than $\theta$. As $\theta$ is increased, the emerging angle increases. For some value of $\theta$, the emerging angle will be 90°. For this and all larger values of $\theta$, total reflection occurs. No light crosses the interface into the second material. The minimum angle at which total reflection occurs is given by SIN $\theta = N2/N1$.

This is the principle used in the fiber optics cable. Light is reflected from side to side of the fiber. The end result is that the light rays are guided down the fiber. The fiber cable can be a single material of index N1 with air serving as the second material. In the preferred embodiment, however, the fibers are made with a core material of index N1 and a cladding of material of index N2. N2 is less than N1. The reflections occur at the interface between the core at 106 and the cladding 105. This type of construction is known as a stepped index fiber.

In FIG. 6, light is assumed to be travelling from left to right. At the left side, light rays are assumed to have entered the fiber with the angles known. Rays such as "A" which have an angle ($\theta$) to the perpendicular less than critical will be refracted at the core to cladding and again retracted at the cladding to air interface. Such rays escape from the fiber and are lost. For a very small value of $\theta$, a ray could be refracted at the cladding and totally reflected to the surface of the cladding. Abrasion and other surface irregularities would soon disperse such rays and they would be lost. Rays such as "B" which have entered with an angle greater than the critical angle will be reflected from side to side as shown. Three reflections are shown in the length of FIG. 6. Rays such as "C" that have larger angle swill travel farther between reflections. Rays such as "D" will have entered parallel to the axis of the core (an angle of 90°) will travel straight through the core with no reflections. It is obvious that ray "D" travels a shorter distance and will arrive at the receiver sooner than "B" and "C". "C" travels a shorter distance and will arrive sooner than "B". There are an unlimited number of ray paths. The different ray paths require different times to travel the distance down the fiber from light emitter to light receiver. The net result is that the rise and fall times at the receiver are lengthened.

Figure 14:
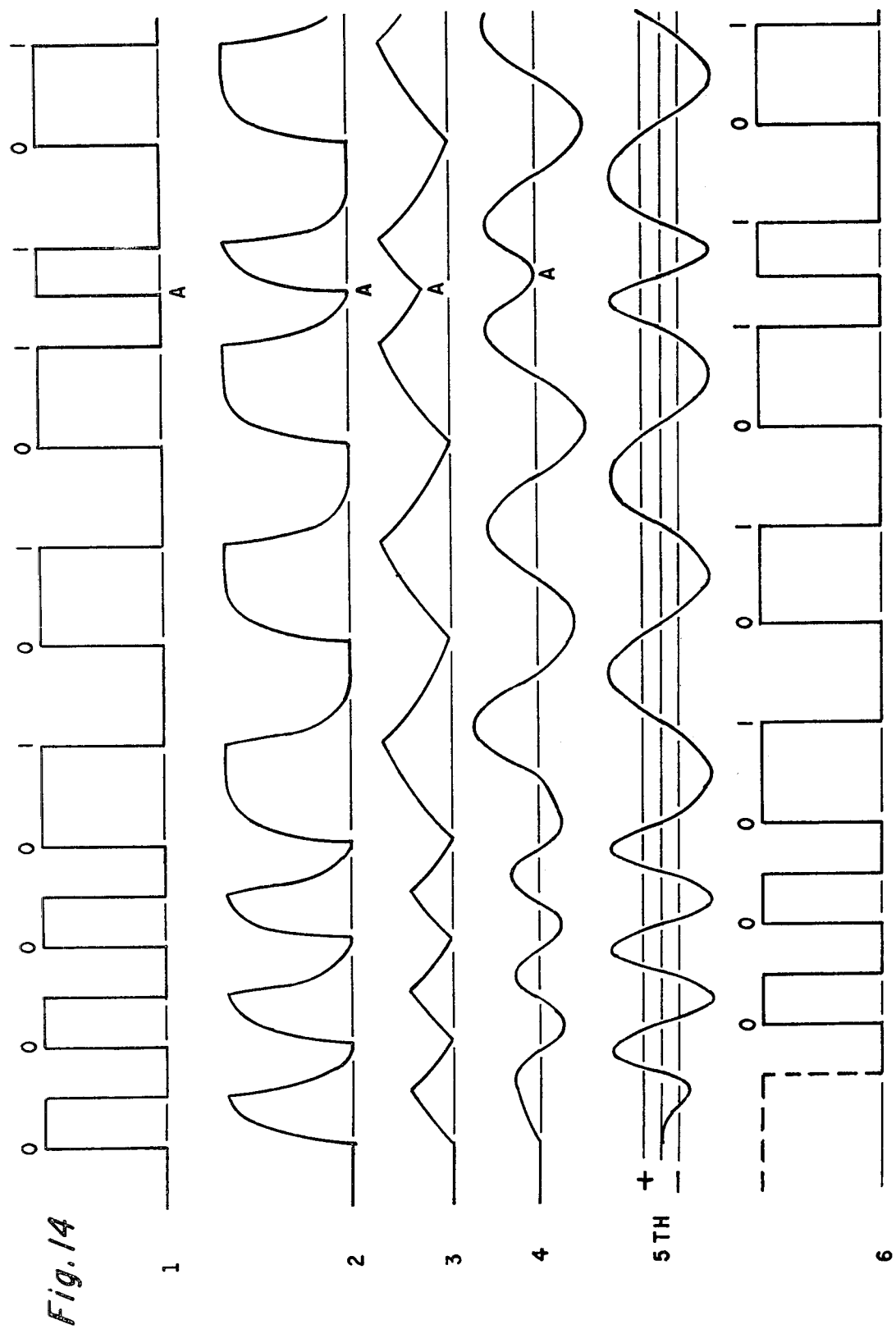
FIG. 14 illustrates wave shapes associated with the decoder of FIG. 2.

Refer to FIG. 14 where line 1 is shown as an encoded bit pattern and is assumed to be perfect. That is, the light emitting diode goes from OFF to ON and ON to OFF instantaneously.

Line 2 illustrates the light received at the photo diode receiver. Starting at the left side of line 2, the light intensity increases with time as the rays that have travelled different paths arrive. When all rays have arrived, the received light attains its maximum intensity. This occurs just as the next transition starts. When the light emitting diode switches off, the rays with the shorter paths will disappear first and the others later. The result is that the fall time is similar to the rise time. The light intensity falls to nearly zero when the next transition starts arriving. When the data pattern is repetitive, i.e., 010101, there is enough time for the intensity to rise to maximum well before the next off transition and to fall completely off well before the next on transition.

Line 3 of FIG. 14 shows a much more serious case which results if the data rate in many times that of line 2. Starting on the left side, the light intensity does not get to the maximum value before the next OFF transition starts. Even with the 0101 pattern, the intensity does not reach the maximum value. It can be noted, with reference to line 1, that the maximum value gets much higher in the 0101 pattern than in all 0's, but does not reach maximum. In the pattern 011, the intensity starts to fall when the first one is encoded. The mid-bit transition prevents the light intensity from falling completely to the OFF state. This is identified as point A on the figure. The light at the receiver never attains maximum intensity and may not fall to the OFF state for some data patterns.

As stated above, line 1 of FIG. 14 illustrates the output of a perfect light emitter. In actual practice, the logic networks and light emitters have delay times and finite rise and fall times. The light receiver also contributes to increasing the rise and fall times. Lines 2 and 3 of FIG. 14 represent the total effort of these delays.

In line 3, the rise and fall time is much slower than that shown in line 2 and the result would be a much greater time jitter of the transitions which could cause decoding errors. For the pattern 011 at point A where the light does not go off, the output of comparator 23 of FIG. 2, for example, might remain a "1" throughout, the two transitions would be missed. This, of course, would cause errors in the decoding. If such a severe situation were expected, the circuit shown in FIG. 15 could be substituted for the circuitry between the input to decoder 25 and the output of comparator 22 of FIG. 2.

Figure 15:
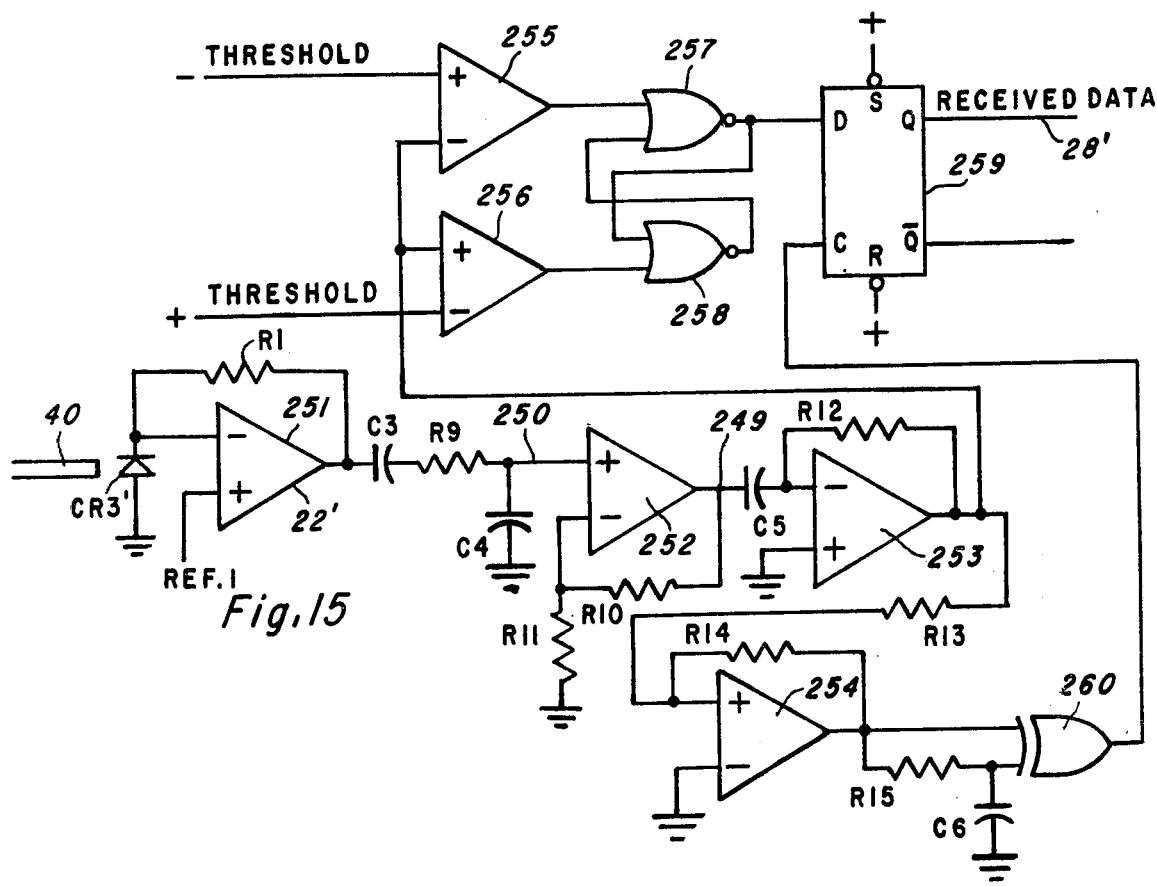
FIG. 15 is a schematic diagram of an optional input circuit for the apparatus of FIG. 2.
Figure 16:
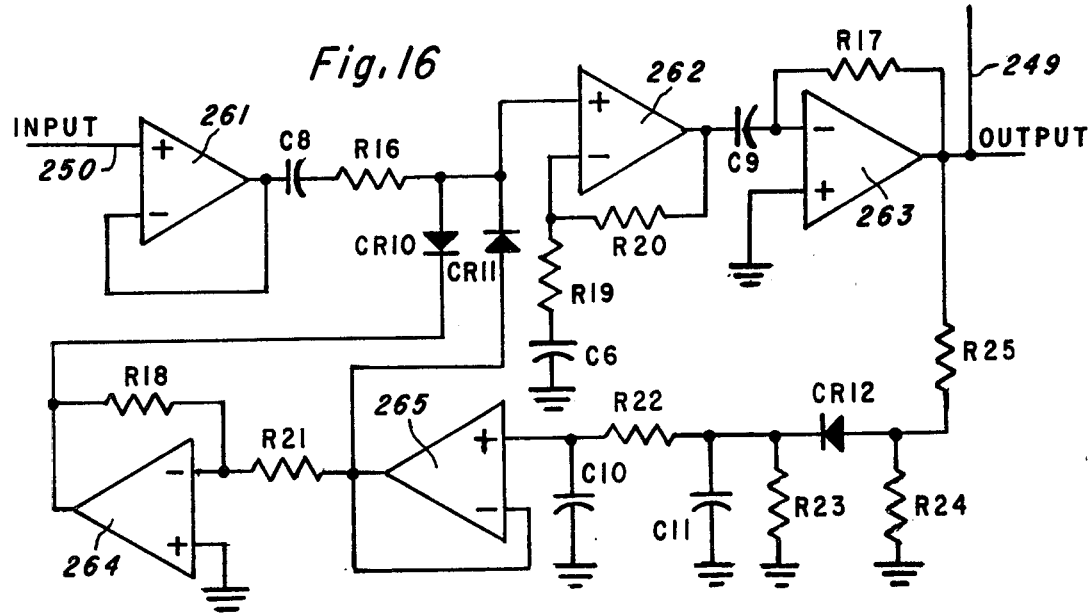
FIG. 16 is a schematic diagram of an amplifier of the apparatus of FIG. 15.

Input fiber 40 is coupled to the circuit comprised of diode CR3', comparator 22' and resistor R1' which correspond to photo diode CR3, comparator 22 and resistor R1 of FIG. 2. The output of comparator 22' is connected through capacitor C3 and then through resistor R9 to the positive input of amplifier 252. Capacitor C4 is connected between the positive input of amplifier 250 and ground and together with R9 provides a filter for attenuating high frequencies. The capacitor C3 is simply a DC blocking capacitor. The cut-off frequency is approximately the frequency of the 0101 pattern. That frequency is attenuated at 3 db. The frequency of a 0000 or 1111 pattern is attenuated at approximately 7 db. The output of amplifier 252 is connected through resistor R10 to its inverting input and the inverting input is also connected through resistor R11 to ground. Resistors R10 and R11 set the gain of the amplifier 252. In the case of a fixed installation which has a constant line loss, resistors R10 and R11 may be permanently installed values. However, if the line loss is subjected to occasional changes, the AGC amplifier of FIG. 16 may be used to replace amplifier 252 of FIG. 15. The AGC amplifier of FIG. 15 is described and claimed in U.S. Pat. No. 3,115,601, so further explanation of that amplifier is not necessary.

The output of the amplifier 252 is shown as the waveform at line 4 of FIG. 14. It can be seen that the filtering by resistor R9 and capacitor C4 did some smoothing and delaying compared to line 3. The 0101 pattern has approximately twice the amplitude of the 0000 or 1111 pattern. The peaks of the waveform represent the maximum input signal. The peaks are detected to yield the original transitions and and the polarity. The peaks are detected by differentiating the signal.

The amplifier 252 output connects through capacitor C5 to the inverting input of operational amplifier 253. The output of operational amplifier 253 feeds back through resistor R12 to the input. This feedback arrangement provides a well known differentiator circuit. The differentiator 253 output is the negative of the derivative of the input. The derivative has a 6 db per octave rise in output, with frequency. This makes the amplitude nearly constant for the different bit patterns. The differentiator 253 output connects to the non-inverting input of voltage comparator 256, the inverting input of voltage comparator 255 and through resistor R13 to the non-inverting input of voltage comparator 254. The non-inverting input of comparator 255 is connected to the negative threshold and the inverting input of comparator 256 is connected to the positive threshold. The output of comparator 254 is connected through resistor R14 to its noninverting input and its inverting input is connected to ground. The output of comparator 254 is also connected to one input of exclusive OR circuit 260 whose other input is connected through resistor R15 to the output of comparator 254 and also through capacitor C6 to ground. The output of exclusive OR circuit 260 is connected to the clock input of flip-flop 259. The output of comparator 255 is connected to one input of NOR circuit 257 whose output connects to one input of NOR circuit 258, these two circuits comprising a latch. The output of NOR circuit 258 is connected to the other input of NOR circuit 257 and the output of comparator 256 is connected to the other input of NOR circuit 258. The output of NOR circuit 257 also is connected to the D input of flip-flop 259 whose Q output is the RECEIVED DATA on line 28', the optional circuit for inputting into decoder 25 of FIG. 2.

When the differentiator 253 output is more negative than the negative threshold (−TH), the voltage comparator 255 output will be a "1" and the voltage comparator 256 output will be a "0". If the voltage comparator 255 output is a "1" the output of NOR gate 257 will be a "0" and is an input to NOR gate 258. Since the other input of NOR gate 258 is "0", its output is a "1", making a second input of NOR gate 257 a "1". This latches the NOR gate 257 output and the D input of flip-flop 259 as a "0". It will remain a "0" even though the output of comparator 255 goes to a "0".

When the differentiator 253 output is more positive than the positive threshold (+TH), the voltage comparator 256 output will be a "1" and the voltage comparator 255 output will be a "0". With the output of comparator 256 a "1", the output of NOR gate 258 will be a "0". This sets the latch of NOR gates 257 and 258 so that the D input to flip flop 259 is latched at a "1".

Voltage comparator 254 functions similarly to comparator 23 of FIG. 2 to quickly flip from "0" to +5 volts or +5 volts to "0". When the comparator 254 output is a "0", both inputs of exclusive OR gate 260 are "0" and the output is a "0". Capacitor C6 has no charge, but when the output of comparator 254 goes to a "1", capacitor C6 holds one input of exclusive OR circuit 260 at a "0", allowing the exclusive OR gate 260 output to go to a "1", clocking flip-flop 259. Capacitor C6 quickly changes to +5 volts and the exclusive OR circuit 260 output goes back to a "0". When comparator 254 output goes to a "0", capacitor C6 maintains one input of exclusive OR circuit 260 at a "1". The output goes to a "1", clocking flip-flop 259. Capacitor C6 quickly discharges, bringing the output of exclusive OR circuit 260 back to a "0". When the differentiator 253 output exceeds the threshold level, the latch comprised of NOR gates 257 and 258 output and the D input of flip-flop 259 is set at a "1" or at a "0", depending on the polarity. Differentiator 253 output will then fall through zero providing a clock to flip-flop 259.

Line 5 of FIG. 14 represents the differentator 253 outputs. The plus and minus thresholds are also shown. Starting at the left side, waveform 5 goes negative with respect to −TH, setting the D input of flip-flops 259 at a "0". Waveform 5 reaches a peak negative value and then starts toward "0". As it crosses "0" and starts positive, the flip-flop 259 is clocked causing its Q output to go to "0". The Q output may have already been an "0". This uncertainty is shown by the dash line in waveform 6. Waveform 6 represents the reproduction of waveform 1, after the various losses discussed above.

Waveform 5 continues positive and becomes larger than +TH, setting the D input of flip-flop 259 at a "1". Waveform 5 continues positive, attains a peak value, and starts to decrease. As it goes through zero, the flip-flop 259 is clocked, making the Q output go to a "1". This is the first OFF to ON transition and is produced by the receipt of the second zero of the preamble. This process continues, recovering the remaining bits of the preamble and all of the data bits. The repetitive zeros of the preamble allow for the loss of the first zero.

FIG. 7 represents the prior art as it relates to seismic exploration over ground. The apparatus described, particularly including the fiber optic cables, is intended to replace the apparatus of FIG. 7. In FIG. 7, the analog module 14 and the roll-along switch 13 are replaced by telemetry interface 15 as shown in FIG. 1. The telemetry interface 15 connects to the controller module 16 in the same manner as the analog module. This enables the use of the controller module, tape transport, camera, and other peripheral equipment with either a conventional or fiber optic system. The telemetry interface 15 translates the commands to the form required for the telemetry system, supplies data/status to the controller, and has the transmitters and receivers. The roll-along switch function is performed by activating only the desired channels or by ignoring the data from the undesired channel.

The marine system is very similar, but the fiber optic cable and the hydrophones are inside a streamer which is towed behind a ship. The streamer is made in identical sections, the sections consisting of waterproof connectors, an outer jacket, and strain members for towing. Space in the streamer is filled with a liquid such as kerosene to provide neutral buoyancy. The streamer is towed by the ship and therefore all detectors are in one direction from the instruments rather than as shown in FIG. 7. Of course the principles set out herein are applicable to marine systems as well as land systems.

This invention is not limited to the fiber optic cable disclosed. As mentioned earlier, another known configuration is available. The fiber optic cable itself contains the light receiver and light emitter so that the connection made between the cable and the telemetry interface is done using an electrical connection.

The utilization of this latter type of optical fiber cable as well as use for marine exploration is obviously contemplated. It is also contemplated that specific configuration designs may be altered without departing from the spirit and scope of this invention.

What is claimed is:

1. A seismic data acquisition system having a plurality of data acquisition units positioned over a seismic prospect area which units have provision for sensing motion in an elastic body and a controller means for providing command signals to, and for receiving data and status signals from, the data acquisition units, comprising:
  (a) telemetry interface means operatively connected to the controller means;
  (b) data acquisition means for the data acquisition units for receiving and formatting signals representative of sensed motion;
  (c) a pair of optical fibers comprising an in-fiber and an out-fiber for light communication between the telemetry interface means and the data acquisition units; and
  (d) telemetry communications means in each of the data acquisition units, for receiving the pair of optical fibers, operatively connected to the respective data acquisition means and having signal detect means for automatic detection of the optical fiber on which the command signals from the controller means are present, providing automatic orientation of the data acquisition units.

2. A land seismic data acquisition system having a plurality of data acquisition units positioned over a seismic prospect area which units each have at least one transducer for sensing motion in the earth, and a controller means for providing command signals to, and for receiving data and status signals from, the data acquisition units comprising:
  (a) telemetry interface means operatively connected to the controller means;
  (b) data acquisition means for the data acquisition units for receiving and formatting signals representative of sensed motion;
  (c) a pair of optical fibers comprising an in-fiber and an out-fiber for light communication between the telemetry interface means and the data acquisition units; and
  (d) telemetry communications means in each of the data acquisition units, for receiving the in-fiber and the out-fiber, operatively connected to the respective data acquisition means and having signal detect means for automatic detection of the optical fiber on which the command signals from the controller means are present, providing automatic orientation of the data acquisition units.

3. The system of claim 1 wherein each of the data acquisition units are serially interconnected by the optical fibers.

4. The system of claim 1 wherein the telemetry interface means comprises:
  (a)
    (i) an input section having responsive means for receiving data and status signals from the optical fibers; and
    (ii) an output section having emitting means for sending command signals over the optical fibers.

5. The system of claim 3 wherein the telemetry interface means comprises:
  (a)
    (i) an input section having responsive means for receiving data and status signals from the optical fibers; and
    (ii) an output section having emitting means for sending command signals over the optical fibers.

6. The system of claim 3 wherein the telemetry communication means in each of the data acquisition units comprises:
  (c)
    (i) input means having responsive means for receiving command signals from the optical fibers; and
    (ii) output means having emitting means for sending data and status signals over the optical fibers.

7. The system of claim 4 wherein the telemetry communication means in each of the data acquisition units comprises:
  (c)
    (i) input means having responsive means for receiving command signals from the optical fibers; and
    (ii) output means having emitting means for sending data and status signals over the optical fibers.

8. The system of claim 5 wherein the telemetry communication means in each of the data acquisition units comprises:
  (c)
    (i) input means having responsive means for receiving command signals from the optical fibers; and
    (ii) output means having emitting means for sending data and status signals over the optical fibers.

9. The system of claim 1 wherein the data acquisition means in each of the data acquisition units comprises:
  (b)
    (i) floating point amplifier means; and
    (ii) analog-to-digital converter means connected to receive the output of the floating point amplifier means for providing digital signals to the telemetry communication means.

10. The system of claim 3 wherein the data acquisition means in each of the data acquisition units comprises:
  (b)
    (i) floating point amplifier means; and
    (ii) analog-to-digital converter means connected to receive the output of the floating point amplifier means for providing digital signals to the telemetry communication means.

11. The system of claim 8 wherein the data acquisition means in each of the data acquisition units comprises:
  (b)
    (i) floating point amplifier means; and
    (ii) analog-to-digital converter means connected to receive the output of the floating point amplifier means for providing digital signals to the telemetry communication means.

12. The system of claim 2 wherein the telemetry communication means in each of the data acquisition units further comprises:
  (c)
    (i) decoding means connected to receive and decode command and data/status signals; and
    (ii) coding means connected to receive and code the decoded command and data/status signals from the decoding means.

13. The system of claim 2 wherein the telemetry interface means comprises:
  (a)
    (i) an input section having responsive means for receiving data/status signals from the optical fibers; and
    (ii) an output section having emitting means for sending command signals over the optical fibers.

14. The system of claim 12 wherein the telemetry communication means in each of the data acquisition units further comprises:

(c)
- (i) decoding means connected to receive and decode command and data/status signals;
- (ii) coding means connected to receive and code the decoded command and data/status signals from the decoding means;
- (iii) input means having responsive means for receiving command signals from the optical fibers; and
- (iv) output means having emitting means for sending data/status signals over the optical fiber cable.

15. The system of claim 13 wherein the telemetry communication means in each of the data acquisition units comprises:

(c)
- (i) decoding means connected to receive and decode command and data/status signals;
- (ii) coding means connected to receive and code the decoded command and data/status signals from the decoding means.

16. The system of claim 14 wherein the telemetry interface means comprises:

(a)
- (i) an input section having responsive means for receiving data and status signals from the optical fibers; and
- (ii) an output section having means for sending command signals over the optical fibers.

17. The system of claim 16 wherein each of the data acquisition units are serially interconnected by the optical fibers.

* * * * *